(12) United States Patent
Xu et al.

(10) Patent No.: US 11,175,821 B2
(45) Date of Patent: Nov. 16, 2021

(54) PRESSURE TOUCH METHOD AND TERMINAL

(71) Applicant: Huawei Technologies Co., Ltd., Shenzhen (CN)

(72) Inventors: Jie Xu, Shanghai (CN); Gang Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/336,288

(22) PCT Filed: Sep. 23, 2016

(86) PCT No.: PCT/CN2016/099868
§ 371 (c)(1),
(2) Date: Mar. 25, 2019

(87) PCT Pub. No.: WO2018/053803
PCT Pub. Date: Mar. 29, 2018

(65) Prior Publication Data
US 2019/0220168 A1 Jul. 18, 2019

(51) Int. Cl.
*G06F 3/0488* (2013.01)
*G06F 3/041* (2006.01)
(Continued)

(52) U.S. Cl.
CPC .......... *G06F 3/0488* (2013.01); *G06F 3/0481* (2013.01); *G06F 3/04142* (2019.05); *G06F 3/04817* (2013.01); *G06F 3/0482* (2013.01)

(58) Field of Classification Search
CPC ............. G06F 3/04817; G06F 3/04142; G06F 3/0481; G06F 3/0482; G06F 3/0488
See application file for complete search history.

(56) References Cited

U.S. PATENT DOCUMENTS 7,694,231 B2 * 4/2010 Kocienda ............ G06F 3/04883
341/20
9,195,351 B1 * 11/2015 Rosenberg ............ G06F 1/1626
(Continued)

FOREIGN PATENT DOCUMENTS

CN 103472948 A 12/2013
CN 104461282 A 3/2015
(Continued)

OTHER PUBLICATIONS

Foreign Communication From A Counterpad Application, European Application No. 16916542.0, Extended European Search Report dated Jul. 10, 2019, 9 pages.
(Continued)

*Primary Examiner* — Julie Anne Watko
(74) *Attorney, Agent, or Firm* — Conley Rose, P.C.

(57) ABSTRACT

A pressure touch method and a terminal, where the method includes detecting a pressure sensing operation generated by a finger on a target touch component, identifying a pressure level corresponding to the pressure sensing operation, determining a function corresponding to the pressure level, and performing the function corresponding to the pressure level. Therefore, different functions triggered to be performed by pressure sensing operations may be determined using combinations of pressure levels and swipe directions, thereby improving convenience of one-hand operations of a user, and also enhancing coherence of user experience.

20 Claims, 19 Drawing Sheets

(51) Int. Cl.
*G06F 3/0481* (2013.01)
*G06F 3/0482* (2013.01)

(56) References Cited

U.S. PATENT DOCUMENTS

| | | | | |
|---|---|---|---|---|
| 10,372,214 | B1* | 8/2019 | Gleeson | G06F 3/0488 |
| 2004/0021643 | A1* | 2/2004 | Hoshino | G06F 3/03547 |
| | | | | 345/173 |
| 2006/0132455 | A1* | 6/2006 | Rimas-Ribikauskas | |
| | | | | G06F 3/0488 |
| | | | | 345/173 |
| 2006/0132456 | A1* | 6/2006 | Anson | G06F 3/0488 |
| | | | | 345/173 |
| 2008/0024459 | A1* | 1/2008 | Poupyrev | G06F 3/016 |
| | | | | 345/173 |
| 2008/0042978 | A1* | 2/2008 | Perez-Noguera | G06F 3/023 |
| | | | | 345/168 |
| 2009/0160793 | A1* | 6/2009 | Rekimoto | G06F 3/04883 |
| | | | | 345/173 |
| 2009/0322695 | A1* | 12/2009 | Cho | G06F 3/016 |
| | | | | 345/173 |
| 2010/0013777 | A1* | 1/2010 | Baudisch | G06F 3/04812 |
| | | | | 345/173 |
| 2010/0066764 | A1* | 3/2010 | Refai | G06F 3/04886 |
| | | | | 345/660 |
| 2010/0225599 | A1* | 9/2010 | Danielsson | G06F 3/0488 |
| | | | | 345/173 |
| 2011/0018828 | A1* | 1/2011 | Wu | G06F 3/04883 |
| | | | | 345/173 |
| 2011/0221684 | A1* | 9/2011 | Rydenhag | G06F 3/0412 |
| | | | | 345/173 |
| 2014/0168093 | A1* | 6/2014 | Lawrence | G06F 3/0414 |
| | | | | 345/173 |
| 2014/0337786 | A1* | 11/2014 | Luo | G06F 3/041 |
| | | | | 715/773 |
| 2014/0362016 | A1 | 12/2014 | Matsuki | |
| 2015/0015763 | A1* | 1/2015 | Lee | H04N 5/23222 |
| | | | | 348/333.05 |
| 2015/0062052 | A1* | 3/2015 | Bernstein | G06F 3/016 |
| | | | | 345/173 |
| 2015/0067559 | A1* | 3/2015 | Missig | G06F 3/03547 |
| | | | | 715/765 |
| 2015/0067560 | A1* | 3/2015 | Cieplinski | G06F 3/04883 |
| | | | | 715/765 |
| 2015/0067596 | A1* | 3/2015 | Brown | G06F 3/0416 |
| | | | | 715/808 |
| 2015/0097785 | A1* | 4/2015 | Shoji | G06F 1/1684 |
| | | | | 345/173 |
| 2015/0146945 | A1* | 5/2015 | Han | G06F 3/0481 |
| | | | | 382/125 |
| 2015/0213244 | A1* | 7/2015 | Lymberopoulos | G06F 21/45 |
| | | | | 726/18 |
| 2015/0378552 | A1* | 12/2015 | Pasquero | G06F 3/0489 |
| | | | | 345/168 |
| 2016/0179245 | A1* | 6/2016 | Johansson | G06F 3/044 |
| | | | | 345/174 |
| 2016/0188181 | A1* | 6/2016 | Smith | G06F 3/04817 |
| | | | | 715/765 |
| 2016/0209948 | A1* | 7/2016 | Tulbert | G06F 3/042 |
| 2016/0239150 | A1* | 8/2016 | Lee | G06F 21/32 |
| 2016/0259413 | A1* | 9/2016 | Anzures | G06F 3/016 |
| 2016/0259489 | A1 | 9/2016 | Yang | |
| 2018/0095596 | A1* | 4/2018 | Turgeman | G06F 3/0418 |

FOREIGN PATENT DOCUMENTS

| | | | |
|---|---|---|---|
| CN | 104793788 | A * | 7/2015 |
| CN | 104793788 | A | 7/2015 |
| CN | 104991819 | A * | 10/2015 |
| CN | 104991819 | A | 10/2015 |
| CN | 105224169 | A | 1/2016 |
| CN | 105303086 | A | 2/2016 |
| CN | 105353947 | A | 2/2016 |
| CN | 105824497 | A | 8/2016 |
| CN | 105930706 | A | 9/2016 |
| CN | 106354411 | A | 1/2017 |
| WO | 2013035724 | A1 | 3/2013 |

OTHER PUBLICATIONS

Machine Translation and Abstract of Chinese Publication No. CN104991819, Oct. 21, 2015, 28 pages.
Machine Translation and Abstract of Chinese Publication No. CN105224169, Sep. 7, 2016, 32 pages.
Machine Translation and Abstract of Chinese Publication No. CN105303086, Feb. 3, 2016, 22 pages.
Machine Translation and Abstract of Chinese Publication No. CN105353947, Feb. 24, 2016, 24 pages.
Machine Translation and Abstract of Chinese Publication No. CN105824497, Aug. 3, 2016, 30 pages.
Machine Translation and Abstract of Chinese Publication No. CN105930706, Sep. 7, 2016, 17 pages.
Machine Translation and Abstract of Chinese Publication No. CN106354411, Jan. 25, 2017, 24 pages.
Foreign Communication From A Counterpart Application, PCT Application No. PCT/CN2016/099868, English Translation of International Search Report dated Jun. 30, 2017, 3 pages.
Foreign Communication From A Counterpart Application, PCT Application No. PCT/CN2016/099868, English Translation of Written Opinion dated Jun. 30, 2017, 7 pages.
Machine Translation and Abstract of Chinese Publication No. CN103472948, Dec. 25, 2013, 31 pages.
Machine Translation and Abstract of Chinese Publication No. CN104461282, Mar. 25, 2015, 22 pages.
Machine Translation and Abstract of Chinese Publication No. CN104793788, Jul. 22, 2015, 41 pages.

* cited by examiner

PRESSURE TOUCH METHOD AND TERMINAL

CROSS-REFERENCE TO RELATED APPLICATIONS

This application is a U.S. National Stage of International Patent Application No. PCT/CN2016/099868 filed on Sep. 23, 2016, which is hereby incorporated by reference in its entirety.

TECHNICAL FIELD

The present invention relates to the field of human-computer interaction technologies, and in particular, to a pressure touch method and a terminal.

BACKGROUND

System navigation functions of a mobile terminal may include backing (Back), jumping to home (Home), and viewing recent tasks (Recent Applications). The backing is used to back to a previous interface from a current interface, a navigation operation of the jumping to home is used to directly return to home from the current interface, and a navigation operation of the viewing recent tasks is used to display application programs or services that a user enables recently.

As shown in FIG. 1, an ANDROID terminal is provided with three navigation keys at the bottom of a screen, and the three navigation keys are separately used to provide a Back function, a Home function and a Recent function. The three navigation keys may be physical keys. Alternatively, the three navigation keys may be virtual keys hidden inside a touchscreen. In actual use, because the three navigation keys are distributed at different locations, a user needs to touch the different locations to trigger different navigation operations, causing inconvenience to one-hand operations of the user.

An IOS terminal is only provided with a physical Home key at the bottom of a screen, and a virtual Back key is set in an interface of an application program. After a user enters a secondary application interface of an application program from a primary interface of the application program, or even enters a deeper-level application interface, the user needs to back to a previous application interface by using a virtual Back key at an upper left corner of a current application interface. This design manner makes it difficult for a user holding a mobile phone with only a right hand to touch the Back key at the upper left corner, causing poor user experience. Moreover, the physical Home key and the virtual Back key in the application interface cannot be used to provide a coherent user experience.

SUMMARY

Embodiments of the present invention provide a pressure touch method and a terminal, so as to determine, by using combinations of pressure levels and swipe directions, different functions triggered to be performed by pressure sensing operations, thereby improving convenience of one-hand operations of a user, and also enhancing coherence of user experience.

A first aspect provides a pressure touch method, including: detecting a pressure sensing operation of a finger acting on a target touch component, and a swipe of the finger on the target touch component; and determining, based on a pressure level corresponding to the pressure sensing operation and a swipe characteristic of the finger, a function corresponding to the pressure sensing operation, and performing the function corresponding to the pressure sensing operation.

In specific implementation, the target touch component may include a touchpad, a pressure sensor, and a fingerprint sensor, where the pressure sensor and the touchpad are disposed opposite to each other, and the fingerprint sensor and the touchpad are disposed opposite to each other. The pressure sensor may be configured to detect a pressure sensing operation of the finger acting on the touchpad, and identify a pressure level corresponding to the pressure sensing operation. The fingerprint sensor may be configured to detect a swipe of the finger on the touchpad, and identify a swipe characteristic of the finger.

In this embodiment of the present invention, the swipe characteristic may include at least one of the following: a swipe direction, a swipe track, and a swipe distance. It should be noted that, the swipe characteristic may further include another swipe characteristic such as a swipe speed. This is not limited herein.

In this embodiment of the present invention, the pressure level may include the level-one pressure and the level-two pressure, where the level-one pressure is less than or equal to the specified pressure threshold, and the level-two pressure is greater than the specified pressure threshold. It should be noted that, the pressure level may be further sub-divided, and more pressure levels are included.

In specific implementation, functions corresponding to one or more combinations of the pressure levels and the swipe characteristics may be preset. For example, a function that may be triggered by a pressure sensing operation of forcefully pressing the target touch component (corresponding to the level-two pressure) and swiping down by the finger is enabling a system notification interface. The example is only an implementation, and should not constitute any limitation.

It should be noted that, the finger is not limited to a finger or hand of a user, or may be a touch apparatus such as a stylus or a touch finger cot.

It can be understood that, by implementing the method described in the first aspect, the pressure sensing operation is divided by using a combination of the pressure level and the swipe characteristic and a corresponding function is triggered to be performed, the user can trigger different functions when the finger does not leave the target touch component, and no touch control needs to be changed, so as to enhance coherence of user operations.

With reference to the first aspect, in some embodiments, the swipe characteristic of the finger may be determined in the following manner: obtaining fingerprint change data corresponding to the finger in a swipe process on the target touch component, and determining the swipe characteristic of the finger based on the fingerprint change data.

With reference to the first aspect, in some embodiments, the target touch component may be a system navigation key. Functions corresponding to the pressure sensing operation may include system navigation functions. The system navigation functions may include backing, jumping to home, and viewing a recent task list. Several pressure sensing operations for triggering system navigation functions provided in embodiments of the present invention are described below in detail.

In specific implementation, if the pressure level is the level-one pressure and a swipe distance of the finger is less than a preset distance threshold, it may be determined that the function corresponding to the pressure sensing operation is a first system navigation function. The first system navigation function may be one of the system navigation functions.

For example, if the finger lightly touches (corresponding to the level-one pressure) the target touch component, and the finger does not swipe on the target touch component (satisfying a condition that a swipe distance of the finger is less than the preset distance threshold), a function that may be triggered is the system navigation function "back".

In specific implementation, if the pressure level is the level-two pressure and a swipe distance of the finger is less than a preset distance threshold, it may be determined that the function corresponding to the pressure sensing operation is a second system navigation function. The second system navigation function may be one of the system navigation functions.

For example, if the finger forcefully presses (corresponding to the level-two pressure) the target touch component, and the finger does not swipe on the target touch component (satisfying the condition that a swipe distance of the finger is less than the preset distance threshold), a function that may be triggered is the system navigation function "jumping to home".

In specific implementation, if the pressure level is the level-one pressure (or the level-two pressure) and a swipe distance of the finger is greater than or equal to a preset distance threshold, it may be determined that the function corresponding to the pressure sensing operation is a third system navigation function. The third system navigation function may be one of the system navigation functions. This implementation indicates that, if the finger pressing (a pressing pressure is the level-one pressure or the level-two pressure) the target touch component swipes, it is determined that the function corresponding to the pressure sensing operation is the third system navigation function.

If a condition that the swipe distance of the finger is greater than or equal to the preset distance threshold is satisfied, the terminal may further determine whether a swipe direction of the finger is a preset swipe direction such as swiping right; and if the swipe direction is a preset swipe direction, determine that a function corresponding to the swipe operation is the third system navigation function.

For example, if the finger lightly touches (corresponding to the level-one pressure) the target touch component, and the finger swipes right on the target touch component, a function that may be triggered is the system navigation function "viewing a recent task list".

It should be noted that, combinations of the pressure levels and the swipe characteristics corresponding to the first system navigation function, the second system navigation function, and the third system navigation function may further interchange with each other, and are not limited to the foregoing correspondence. That is, each of the first system navigation function, the second system navigation function, and the third system navigation function may be one of the three system navigation functions: backing to a previous level, jumping to home, and viewing a recent task list.

With reference to the first aspect, in some embodiments, an action time period corresponding to the pressure sensing operation may be further recorded, and the function corresponding to the pressure sensing operation is determined based on a combination of the pressure level, the swipe characteristic, and the action time period.

In this embodiment of the present invention, the action time period corresponding to the pressure sensing operation may include touch&hold and short tap, where the touch&hold is greater than a specified time period threshold, and the short tap is less than or equal to the specified time period threshold. It should be noted that, the action time period may be further sub-divided, and is not limited to the touch&hold and the short tap.

For example, when the finger lightly touches (corresponding to the level-one pressure) the target touch component, the finger does not swipe, and an action time period for which the light touch lasts exceeds a first time period threshold (corresponding to touch&hold), a function that may be triggered is enabling a speech recognition interface, providing convenience for the user to perform speech control. For another example, when the finger forcefully presses (corresponding to the level-two pressure) the target touch component, the finger does not swipe, and an action time period for which the forceful pressing lasts exceeds a two time period threshold (corresponding to touch&hold), a function that may be triggered is enabling a power-off interface, providing convenience for the user to perform a power-off operation. The example is only an implementation provided in this embodiment of the present invention, and should not constitute any limitation.

With reference to the first aspect, in some embodiments, when a pressure sensing operation of the finger acting on the target touch component is detected, a pressure of the finger acting on the target touch component may be further obtained after an adaptation time period T0, and a pressure level corresponding to the pressure sensing operation is determined based on the pressure. In this way, some pressure sensing operations whose pressure values are not stable before the adaptation time period T0 may be filtered out.

With reference to the first aspect, in some embodiments, the target touch component may alternatively be a pressure screen, and the pressure screen may be disposed in a screen (to cover the screen wholly or partially), or may be disposed in an area at the bottom of a screen.

A second aspect provides a terminal, configured to implement the method of the first aspect. The terminal may include: a target touch component and a processor, where the target touch component includes a pressure sensor and a fingerprint sensor, where the pressure sensor may be configured to detect a pressure sensing operation of a finger acting on the target touch component, the fingerprint sensor may be configured to detect a swipe of the finger on the target touch component, and the processor may be configured to determine, based on a pressure level corresponding to the pressure sensing operation and a swipe characteristic of the finger, a function corresponding to the pressure sensing operation, and perform the function corresponding to the pressure sensing operation.

In this embodiment of the present invention, the swipe characteristic may include at least one of a swipe direction, a swipe track, or a swipe distance. It should be noted that, the swipe characteristic may further include another characteristic such as a swipe speed. This is not limited herein.

In this embodiment of the present invention, the pressure level may include the level-one pressure and the level-two pressure, where the level-one pressure is less than or equal to the specified pressure threshold, and the level-two pressure is greater than the specified pressure threshold. It should be noted that, the pressure level may be further sub-divided, and more pressure levels are included.

In specific implementation, the processor may preset functions corresponding to one or more combinations of the pressure levels and the swipe characteristics. For example, a function that is triggered corresponding to a pressure sensing operation of forcefully pressing the target touch component (corresponding to the level-two pressure) and swiping down by the finger is enabling a system notification interface. The example is only an implementation, and should not constitute any limitation.

With reference to the second aspect, in some embodiments, the target touch component may be specifically a system navigation key disposed at the bottom of a touchscreen. Correspondingly, a pressure sensing operation acting on the system navigation key may be mainly used to trigger a system navigation function such as "backing", "jumping to home", or "viewing a recent task list". In some embodiments, the target touch component may be a pressure screen, and the pressure screen may be disposed in a screen (to cover the screen wholly or partially), or may be disposed in an area at the bottom of a screen.

In some embodiments, in some embodiments, the fingerprint sensor may be configured to obtain fingerprint change data corresponding to the finger in a swipe process on the target touch component. The processor may be further configured to determine the swipe characteristic of the finger based on the fingerprint change data obtained by the fingerprint sensor.

With reference to the second aspect, in some embodiments, the processor may be specifically configured to: if the pressure level is a level-one pressure and a swipe distance of the finger is less than a preset distance threshold, determine that the function corresponding to the pressure sensing operation is a first system navigation function.

For example, if the pressure sensor detects that the finger lightly touches (corresponding to the level-one pressure) the target touch component, and the fingerprint sensor detects that the finger does not swipe on the target touch component (satisfying a condition that a swipe distance of the finger is less than the preset distance threshold), the processor may trigger to perform the system navigation function "backing".

With reference to the second aspect, in some embodiments, the processor may be specifically configured to: if the pressure level is a level-two pressure and a swipe distance of the finger is less than a preset distance threshold, determine that the function corresponding to the pressure sensing operation is a second system navigation function.

For example, if the pressure sensor detects that the finger forcefully presses (corresponding to the level-two pressure) the target touch component, and the fingerprint sensor detects that the finger does not swipe on the target touch component (satisfying a condition that a swipe distance of the finger is less than the preset distance threshold), the processor may trigger to perform the system navigation function "jumping to home".

With reference to the second aspect, in some embodiments, the processor may be specifically configured to: if the pressure level is a level-one pressure or a level-two pressure and a swipe distance of the finger is greater than or equal to a preset distance threshold, determine that the function corresponding to the pressure sensing operation is a third system navigation function.

If a condition that the swipe distance of the finger is greater than or equal to the preset distance threshold is satisfied, the processor may further determine whether a swipe direction of the finger is a preset swipe direction such as swiping right; and if the swipe direction is a preset swipe direction, determine that a function corresponding to the swipe operation is the third system navigation function.

For example, if the pressure sensor detects that the finger lightly touches (corresponding to the level-one pressure) the target touch component, and the fingerprint sensor detects that the finger swipes right on the target touch component, a function that may be triggered by the processor is the system navigation function "viewing a recent task list".

It should be noted that, combinations of the pressure levels and the swipe characteristics corresponding to the first system navigation function, the second system navigation function, and the third system navigation function may further interchange with each other, and are not limited to the foregoing correspondence. That is, each of the first system navigation function, the second system navigation function, and the third system navigation function is one of the three system navigation functions: backing to a previous level, jumping to home, and viewing a recent task list.

With reference to the second aspect, in some embodiments, the terminal may further include: a timer. The timer may be configured to record an action time period corresponding to the pressure sensing operation. Specifically, the processor may be specifically configured to determine, based on a combination of the pressure level, the swipe characteristic, and the action time period, the function corresponding to the pressure sensing operation.

In this embodiment of the present invention, the action time period corresponding to the pressure sensing operation may include touch&hold and short tap, where the touch&hold is greater than a specified time period threshold, and the short tap is less than the specified time period threshold. It should be noted that, the action time period may be further sub-divided, and is not limited to the touch&hold and the short tap.

For example, if the pressure sensor detects that the finger lightly touches (corresponding to the level-one pressure) the target touch component, the fingerprint sensor detects that the finger does not swipe, and an action time period recorded by the timer exceeds a first time period threshold (corresponding to touch&hold), the processor may trigger enabling a speech recognition interface, providing convenience for the user to perform speech control.

With reference to the second aspect, in some embodiments, when detecting a pressure sensing operation of the finger acting on the target touch component, the pressure sensor may further obtain, after an adaptation time period T0, a pressure of the finger acting on the target touch component, and determine, based on the pressure, a pressure level corresponding to the pressure sensing operation. In this way, some pressure sensing operations whose pressure values are not stable before the adaptation time period T0 may be filtered out.

A third aspect provides a terminal, including a functional unit configured to perform the method of the first aspect.

A fourth aspect provides a readable non-volatile storage medium storing computer instructions. The computer instructions are executed by the terminal described in the second aspect or the third aspect to implement the method described in the first aspect.

By implementing the embodiments of the present invention, different functions triggered to be performed by pressure sensing operations may be determined by using combinations of pressure levels and swipe directions, thereby improving convenience of one-hand operations of a user, and also enhancing coherence of user experience.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Terms used in implementations of the present invention are used to only explain specific embodiments of the present invention, and are not intended to limit the present invention.

First, a pressure sensing operation related to the embodiments of the present invention and a target touch component configured to detect the pressure sensing operation are described.

Figure 1:
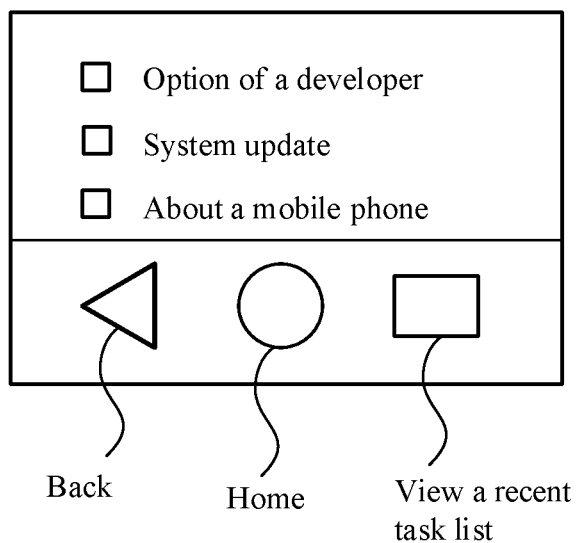
FIG. 1 is a schematic diagram of the prior art related to embodiments of the present invention.
Figure 2:
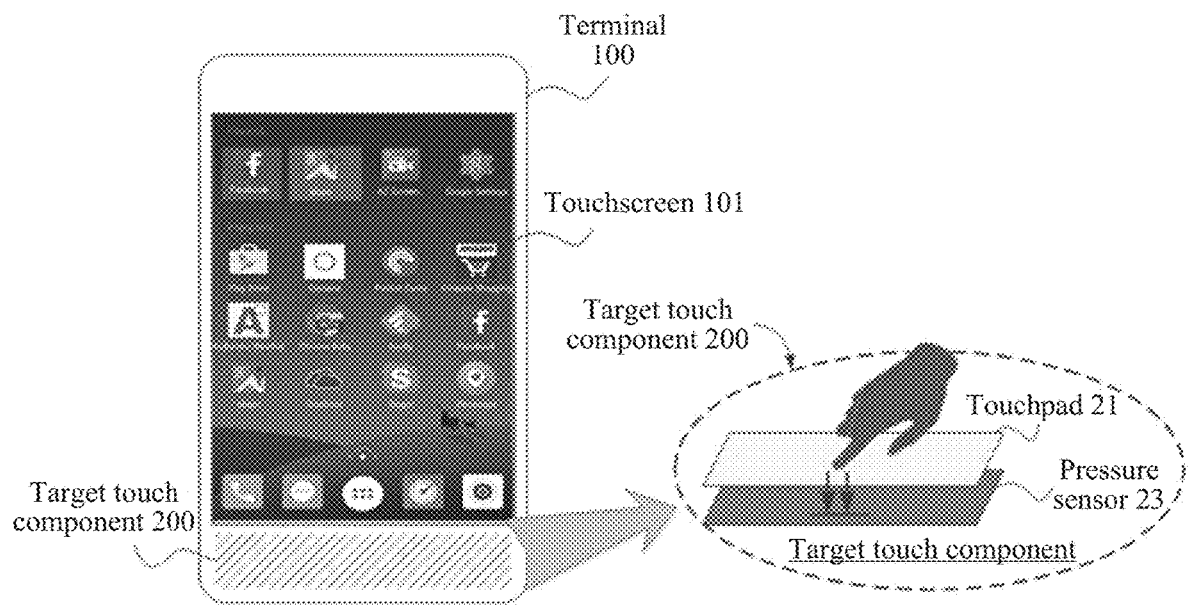
FIG. 2 is a schematic structural diagram of a target touch component according to an embodiment of the present invention.

FIG. 2 is a schematic diagram of an embodiment of a target touch component 200 according to an embodiment of the present invention.

As shown in FIG. 2, the target touch component 200 on a terminal 100 may be disposed at the bottom of a screen 101, as shown in a slash area in the figure. The target touch component 200 may include a touchpad 21 and a pressure sensor 23, where the touchpad 21 and the pressure sensor 23 are disposed opposite to each other. The pressure sensor 23 is configured to detect a pressure sensing operation acting on the touchpad 21, and identify a pressure level corresponding to the pressure sensing operation. The pressure sensing operation related to this embodiment of the present invention is a user operation of pressing the target touch component 200 by a user with a finger. Herein, a higher pressure level indicates a larger pressure applied to the target touch component 200 by the finger of the user.

In specific implementation, the touchpad 21 may be a flexible insulation protection layer. The pressure sensor 23 may include a resistive strain gauge pressure sensor, a piezoresistive pressure sensor, an inductive pressure sensor, a capacitive pressure sensor, or the like. Using the resistive strain gauge pressure sensor as an example, a strain gauge in the resistive strain gauge pressure sensor is deformed because of a pressure. A pressure level that the pressure sensor 23 can identify corresponds to a deformation threshold of the strain gauge. For example, a level-one pressure corresponds to a first deformation threshold, and a level-two pressure corresponds to a second deformation threshold, where the second deformation threshold indicates a larger deformation extent. The example is used to only explain this embodiment of the present invention, and should not constitute a limitation.

It should be noted that, in addition to detecting a pressure sensing operation of the finger acting on the target touch component 200 when the terminal 100 is in a screen-on state, as shown in the accompanying drawing, when the terminal 100 is in a running state such as screen-off or lock screen, the pressure sensor 23 may also detect a pressure sensing operation of the finger acting on the target touch component 200.

Figure 3:
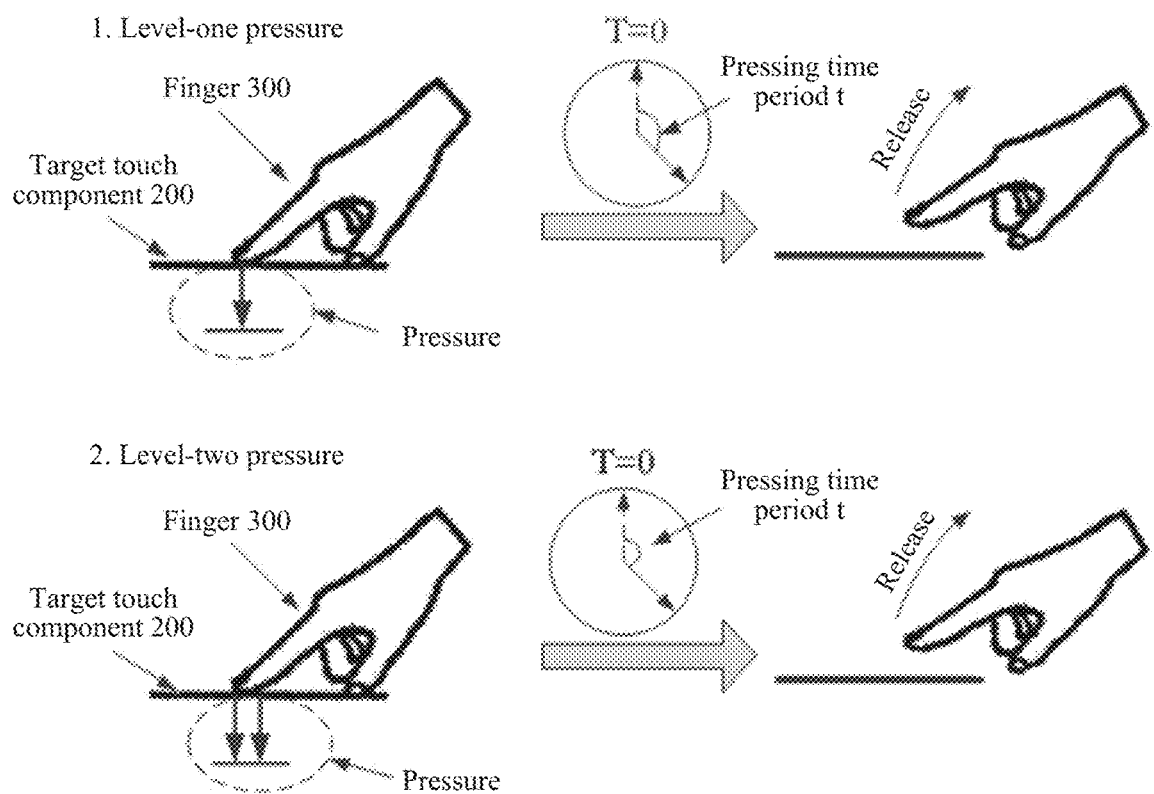
FIG. 3 is a schematic diagram of a pressure sensing operation according to an embodiment of the present invention.

FIG. 3 is a schematic diagram of a pressure sensing operation according to an embodiment of the present invention. As shown in FIG. 3, a larger pressure applied to a target touch component 200 by a finger 300 indicates a possibly higher pressure level corresponding to the pressure sensing operation. If a system detects a pressure sensing operation acting on the target touch component 200, a pressure level corresponding to the pressure sensing operation may be determined. It should be noted that, the finger 300 is not limited to a finger or hand of a user, or may be a touch apparatus such as a stylus or a touch finger cot.

In specific implementation, a pressure threshold may be set, and the pressure threshold may be used to divide a pressure corresponding to the pressure sensing operation into two levels such as a level-one pressure and a level-two pressure shown in FIG. 3. The level-one pressure is a pressure less than the pressure threshold, and the level-two pressure is a pressure greater than the pressure threshold. In actual application, two pressure thresholds such as a first pressure threshold and a second pressure threshold may be further set, and the two pressure thresholds may be used to dividing a pressure corresponding to the pressure sensing operation into three levels. Specifically, a level-one pressure is a pressure less than the first pressure threshold, a level-two pressure is a pressure greater than the first pressure threshold and less than the second pressure threshold, and a level-three pressure is a pressure greater than the second pressure threshold. It should be noted that, when this embodiment of the present invention is implemented, more pressure thresholds may be further set, and are used to sub-divide a pressure into more levels. This is not limited herein.

In some embodiments, as shown in FIG. 3, in addition to the pressure level corresponding to the pressure sensing operation, the system may further detect an action time period corresponding to the pressure sensing operation. In addition to the pressure level corresponding to the pressure sensing operation, the system may further divide the pressure sensing operation with reference to a difference between action time periods corresponding to the pressure sensing operation. Herein, the action time period is a time period for which the finger 300 consecutively presses the target touch component 200.

For example, the action time period corresponding to the pressure sensing operation may be divided into touch&hold and short tap. Using two pressure levels shown in FIG. 3 as an example, the system may further divide, with reference to a difference between two pressing time periods, that is, the touch&hold and the short tap, the pressure sensing operation into four types: a first pressure sensing operation (a combination of the level-one pressure and the short tap), a second pressure sensing operation (a combination of the level-one pressure and the touch&hold), a third pressure sensing operation (a combination of the level-two pressure and the short tap), and a fourth pressure sensing operation (a combination of the level-two pressure and the touch&hold). In actual application, the action time period may be further sub-divided, and is not limited to the touch&hold and the short tap.

It should be noted that, for a pressure sensing operation at the level-one pressure shown in FIG. 3, the action time period is a time period for which the finger 300 consecutively presses the target touch component 200 with a pressing pressure of the level-one pressure. For a pressure sensing operation at the level-two pressure shown in FIG. 3, the action time period is a time period for which the finger 300 consecutively presses the target touch component 200 with the level-two pressure.

Figure 4:
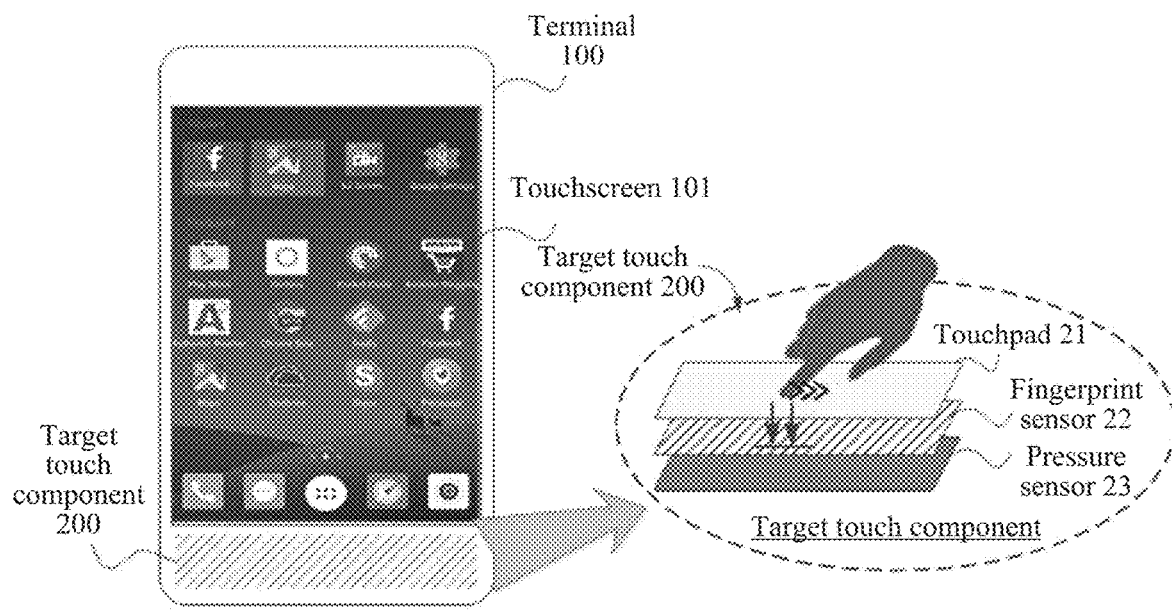
FIG. 4 is a schematic structural diagram of another target touch component according to an embodiment of the present invention.

FIG. 4 is a schematic diagram of another embodiment of a target touch component 200 according to an embodiment of the present invention.

As shown in FIG. 4, in addition to including a touchpad 21 and a pressure sensor 23, the target touch component 200 may further include a fingerprint sensor 22. The fingerprint sensor 22 and the touchpad 21 are disposed opposite to each other, and the fingerprint sensor 22 is configured to detect a swipe of a finger 300 acting on the touchpad 21, and can identify a swipe characteristic of the finger 300 on the touchpad 21, such as a swipe direction, a swipe track, or a swipe distance.

In specific implementation, the fingerprint sensor 22 may include a capacitive fingerprint sensor, an inductive fingerprint sensor, an optical fingerprint sensor, or the like. Using the capacitive fingerprint sensor as an example, the fingerprint sensor 22 may be one capacitive electrode array, and one electrode corresponds to one coordinate point. When the finger 200 swipes, a swipe characteristic of the finger, such as a swipe direction or a swipe distance may be analyzed based on a capacitance change collected by each electrode.

As shown in FIG. 4, in a possible application scenario, in addition to pressing the target touch component 200, the finger 300 may further swipe on the target touch component 200. For this application scenario, in addition to detecting, by using the pressure sensor 23, a pressure of the finger 300 acting on the pressure sensing touch component 200, a system may further detect a swipe characteristic of the finger 300 by using the fingerprint sensor 22. The swipe characteristic may include a swipe direction, a swipe distance, a swipe track, or the like.

In specific implementation, the fingerprint sensor 22 may obtain corresponding fingerprint change data when the finger 300 swipes on the target touch component 200, and then determine the swipe characteristic of the finger 300 based on the fingerprint change data. It can be understood that, when the finger 300 swipes, the fingerprint sensor 22 may collect a set of fingerprint data, and may obtain, through analysis, the swipe characteristic of the finger 300, for example, the swipe direction based on a fingerprint change indicated by this set of fingerprint data.

In addition to magnitude of a pressing pressure, the system may further divide the pressure sensing operation with reference to a difference between swipe characteristics. Pressure sensing operations at two levels of pressures shown in FIG. 3 are used as an example below, and a specific description is made with reference to FIG. 5A to FIG. 5C.

Figure 5A:
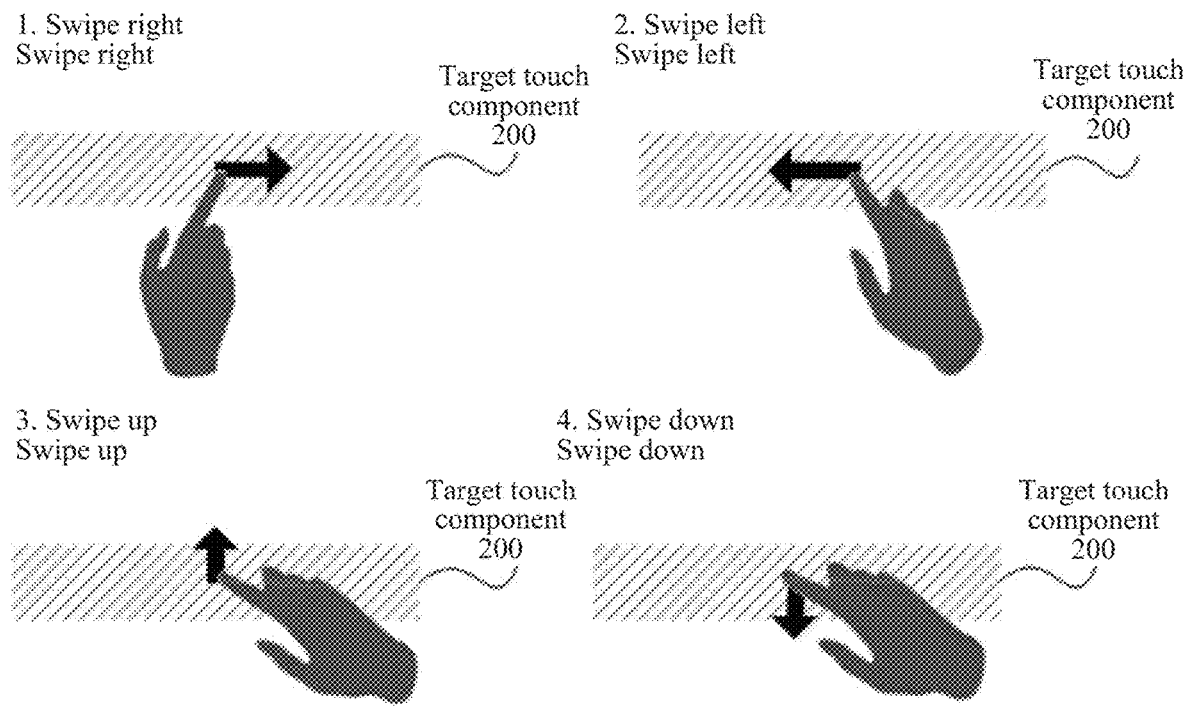
FIG. 5A to FIG. 5C are schematic diagrams of several swipe characteristics according to an embodiment of the present invention.

As shown in FIG. 5A, in addition to magnitude of a pressing pressure, a system may further detect a swipe direction of a finger 300. In addition to the magnitude of the pressing pressure, the system may further divide the pressure sensing operation with reference to a difference between swipe directions. For example, with reference to four swipe directions of up, down, left, and right shown in FIG. 5A, the pressure sensing operations at the two levels of pressures in FIG. 3 may be further divided into eight pressure sensing operations: a first pressure sensing operation (a combination of a level-one pressure and swiping up), a second pressure sensing operation (a combination of the level-one pressure and swiping down), a third pressure sensing operation (a combination of a level-two pressure and swiping up), a fourth pressure sensing operation (a combination of the level-two pressure and swiping down), a fifth pressure sensing operation (a combination of the level-one pressure and swiping left), a sixth pressure sensing operation (a combination of the level-one pressure and swiping right), a seventh pressure sensing operation (a combination of the level-two pressure and swiping left), and an eighth pressure sensing operation (a combination of the level-two pressure and swiping right). In actual application, the swipe direction may further include another direction, for example, swiping to upper left or swiping to lower right, and is not limited to the four swipe directions shown in FIG. 5A.

Figure 5B:
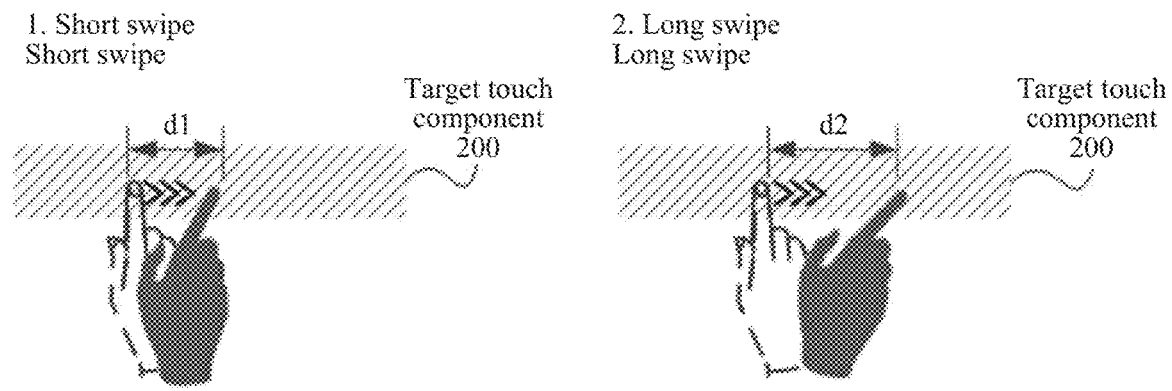

As shown in FIG. 5B, in addition to magnitude of a pressing pressure, a system may further detect a swipe distance of a finger 300. In addition to the magnitude of the pressing pressure, the system may further divide the pressure sensing operation with reference to a difference between swipe distances. For example, with reference to two swipe distances of a short distance and a long distance shown in FIG. 5B, the pressure sensing operations at the two levels of pressures in FIG. 3 may be further divided into four pressure sensing operations: a first pressure sensing operation (a combination of the level-one pressure and a short swipe), a second pressure sensing operation (a combination of the level-one pressure and a long swipe), a third pressure sensing operation (a combination of the level-two pressure and the short swipe), and a fourth pressure sensing operation (a combination of the level-two pressure and the long swipe). In actual application, a difference between the pressing time periods may be further sub-divided, and is not limited to the touch&hold and the short tap.

Figure 5C:
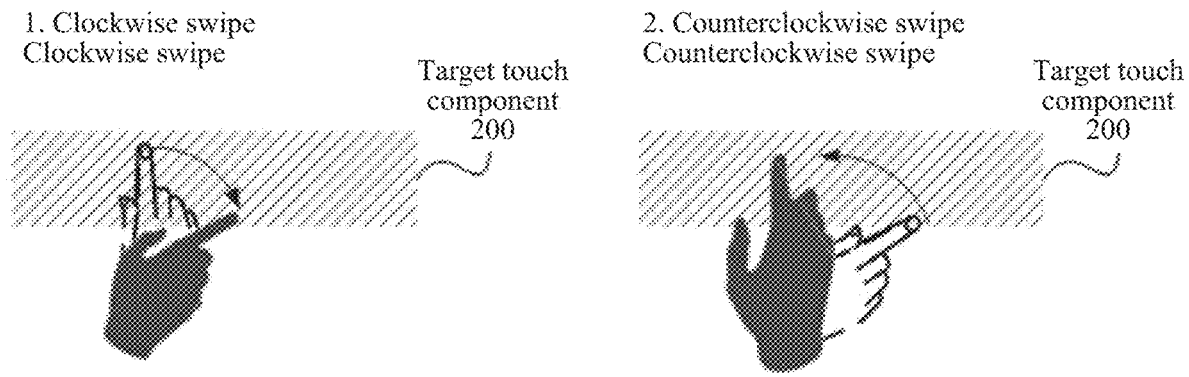

As shown in FIG. 5C, in addition to magnitude of a pressing pressure, a system may further detect a swipe track of a finger 300. In addition to the magnitude of the pressing pressure, the system may further divide the pressure sensing operation with reference to a difference between swipe tracks. For example, with reference to two swipe tracks of a clockwise arc-shaped track and a counterclockwise arc-shaped track shown in FIG. 5C, the pressure sensing operations at the two levels of pressures in FIG. 3 may be further divided into four pressure sensing operations: a first pressure sensing operation (a combination of the level-one pressure and the clockwise arc-shaped track), a second pressure sensing operation (a combination of the level-one pressure and the counterclockwise arc-shaped track), a third pressure sensing operation (a combination of the level-two pressure and the clockwise arc-shaped track), and a fourth pressure sensing operation (a combination of the level-two pressure and the counterclockwise arc-shaped track). In actual application, the pressing track may further include another track such as a Z-shaped track, and is not limited to the clockwise arc-shaped track and the counterclockwise arc-shaped track.

It should be noted that, in addition to the foregoing several swipe characteristics, the system may further detect another swipe characteristic of the finger 300, for example, a swipe speed, to further divide the pressure sensing operation. For example, two swipe speeds of a rapid swipe and a slow swipe may occur in the pressure sensing operation. The pressure sensing operation at two pressure levels shown in FIG. 3 may also be further divided into four pressure sensing operations with reference to a difference between the two swipe speeds.

It should be noted that, in addition to detecting a swipe characteristic of the finger on the target touch component 200 when a terminal 100 is in a screen-on state, as shown in the accompanying drawing, when the terminal 100 is in a running state such as screen-off or lock screen, a fingerprint sensor 22 may also detect a swipe characteristic of the finger on the target touch component 200.

In this embodiment of the present invention, pressure sensing operations at various levels of pressures may be sub-divided into a plurality of different pressure sensing operations with reference to a swipe characteristic of the finger 300. Pressure sensing operations at two levels of pressures shown in FIG. 3 are used as an example below, and an example of a description is provided with reference to FIG. 6 to FIG. 16.

Figure 6:
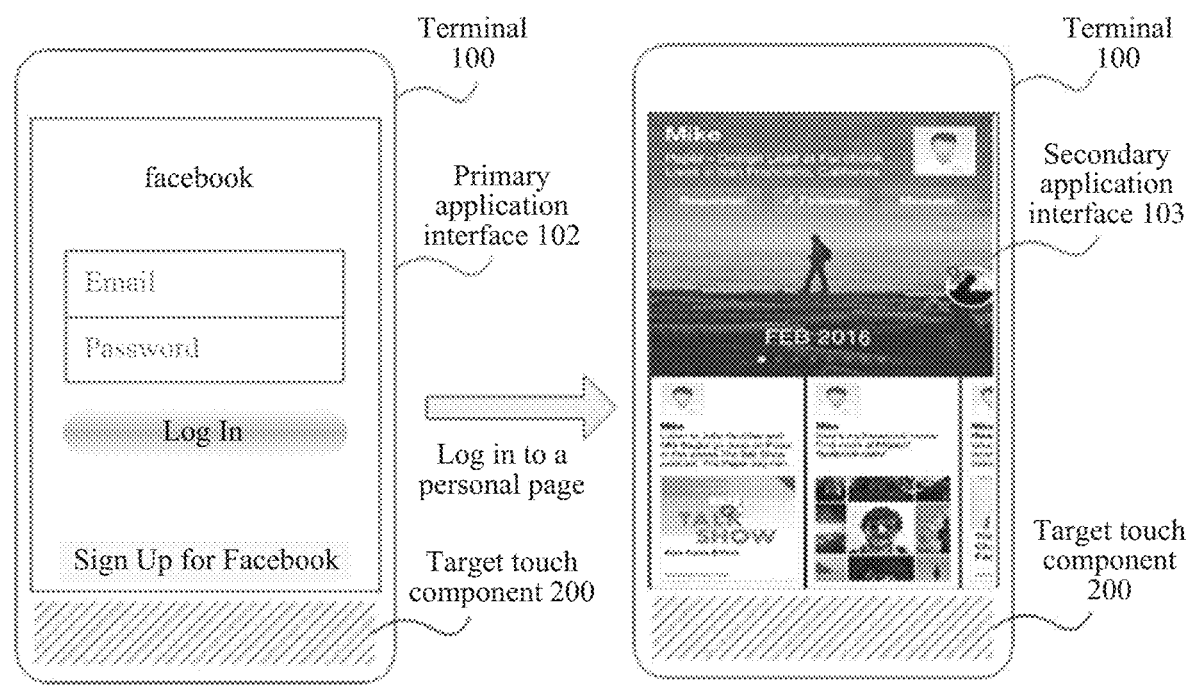
FIG. 6 is a schematic diagram of entering a secondary application interface from a primary application interface by a user.

FIG. 6 shows two application interfaces of an application program Facebook (Facebook): a primary application interface 102 and a secondary application interface 103. First, a user may click an application icon of Facebook at home (Home) to enable the primary application interface 102 of Facebook. Then, the user may enter an account number and a password on the primary application interface 102 to log in to a personal page, that is, enter a next level of application interface: the secondary application interface 103.

Figure 7:
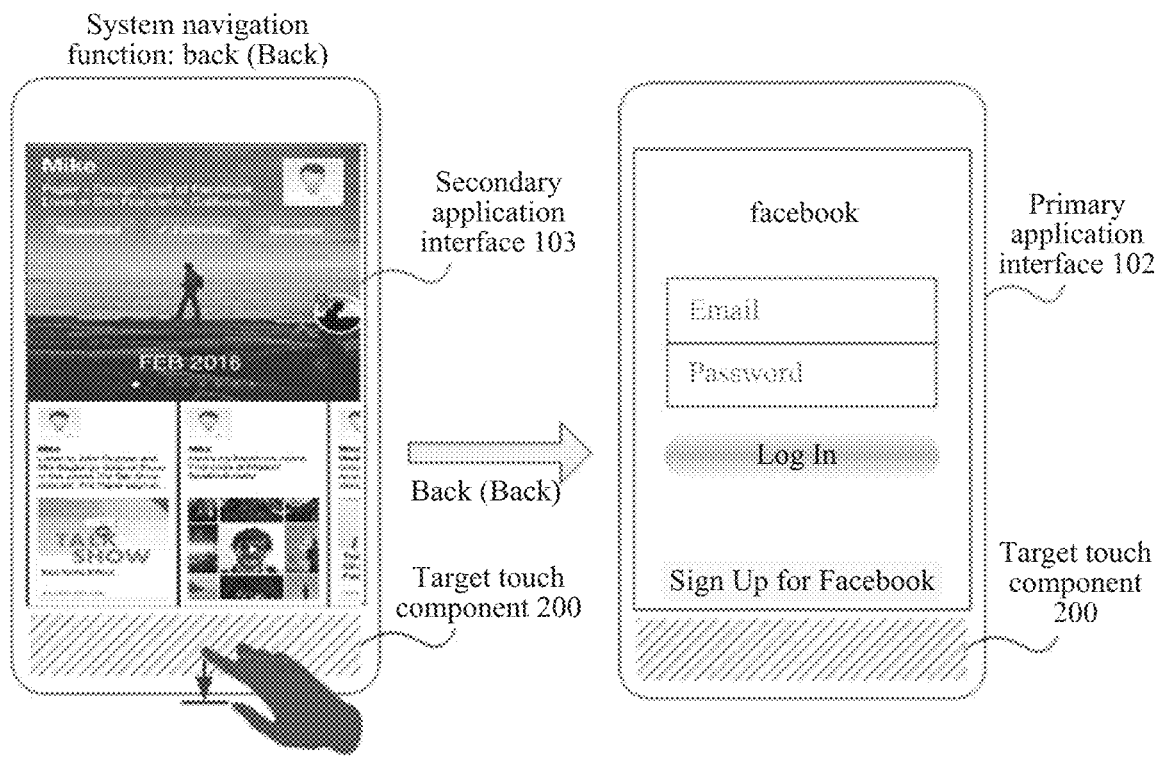
FIG. 7 is a schematic diagram of a function corresponding to a level-one pressure according to an embodiment of the present invention.

As shown in FIG. 7, content currently being displayed on a screen 101 may be but is not limited to a secondary application interface 103 of an application program Facebook, such as a personal page of a user "Mike". In this case, a finger 300 lightly touches (corresponding to a level-one pressure) a target touch component 200, and the finger 300 does not swipe. In specific implementation, a function corresponding to a pressure sensing operation shown in FIG. 7 (the level-one pressure and the finger 300 does not swipe) may be preset to be a system navigation function "backing". When detecting the pressure sensing operation shown in FIG. 7, a system may trigger to perform the system navigation function "backing". For example, as shown in FIG. 7, the content displayed on the screen 101 backs from the secondary application interface 103 to a primary application interface 102. In this way, it is convenient for the user to back to a previous level of interface.

Figure 8:
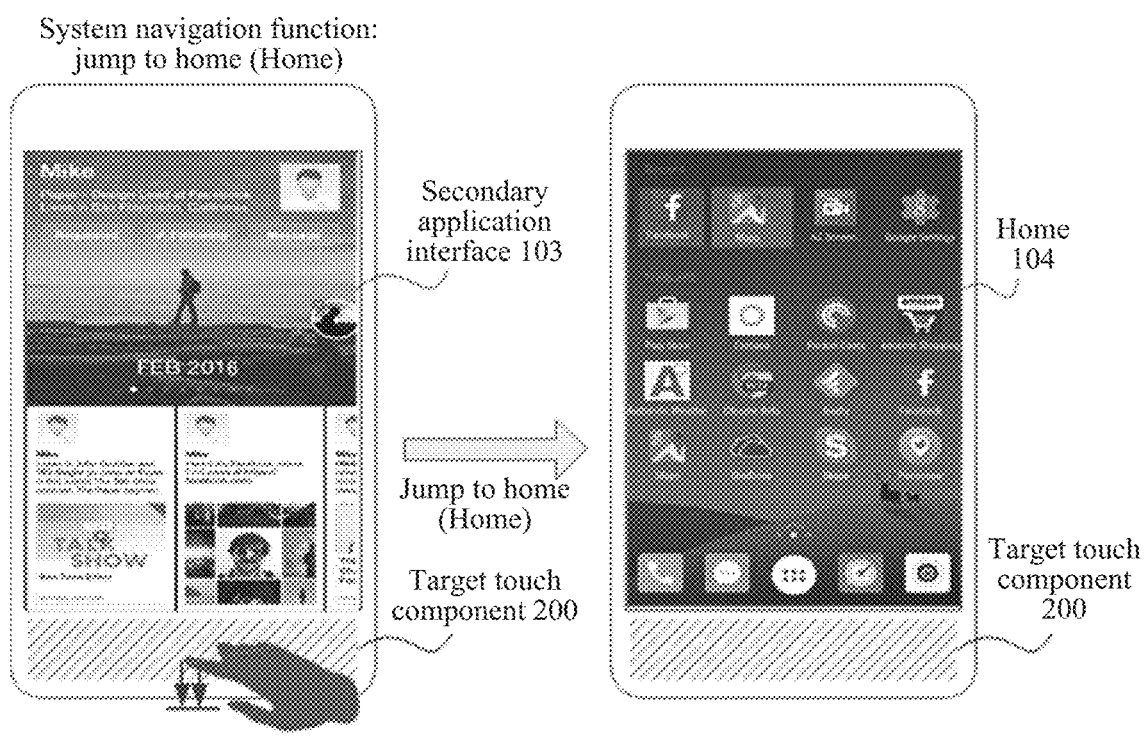
FIG. 8 is a schematic diagram of a function corresponding to a level-two pressure according to an embodiment of the present invention.

As shown in FIG. 8, content currently being displayed on a screen 101 may be but is not limited to a secondary application interface 103 of an application program Facebook, such as a personal page of a user "Mike". In this case, a finger 300 forcefully presses (corresponding to a level-two pressure) a target touch component 200. In specific implementation, a function corresponding to a pressure sensing operation shown in FIG. 8 (the level-two pressure and the finger 300 does not swipe) may be preset to be a system navigation function "jumping to home". When detecting the pressure sensing operation shown in FIG. 8, a system may trigger to perform the system navigation function "jumping to home". For example, as shown in FIG. 8, the content displayed on the screen 101 jumps from the secondary application interface 103 to a home 104. In this way, it is convenient for the user to jump to the home.

Figure 9:
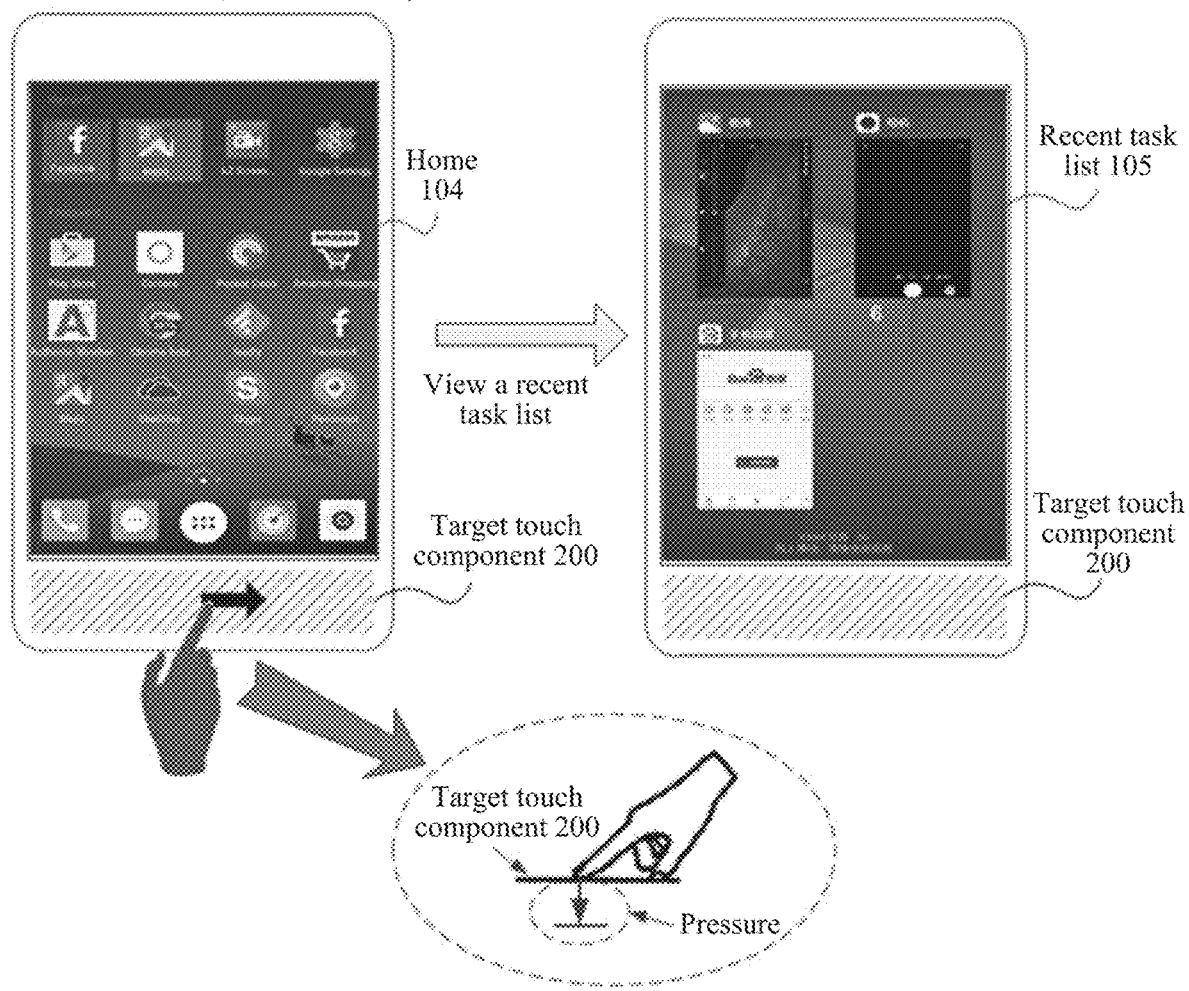
FIG. 9 is a schematic diagram of a function corresponding to a combination of a level-one pressure and swiping right according to an embodiment of the present invention.

As shown in FIG. 9, content currently being displayed on a screen 101 may be but is not limited to a home 104. In this case, a finger 300 lightly touches (corresponding to a level-one pressure) a target touch component 200 and swipes right on the target touch component 200. In specific implementation, a function corresponding to a pressure sensing operation shown in FIG. 7 (a combination of the level-one pressure and swiping right) may be preset to be a system navigation function "viewing a recent task list". When detecting the pressure sensing operation shown in FIG. 9, a system may trigger to perform the system navigation function "viewing a recent task list". That is, a recent task list 105 is displayed on the screen 101, so as to provide convenience for a user to rapidly view an application program or a service that is recently run, and better manage a system running environment.

Herein, no swipe of the finger 300 is a swipe characteristic. The system may define a swipe whose swipe distance is less than a preset distance threshold as light touch.

FIG. 7 to FIG. 9 show several pressure sensing operations used to trigger system navigation functions. The system determines different system navigation functions corresponding to the pressure sensing operations based on different combinations of pressure levels and swipe characteristics. Corresponding to examples in FIG. 7 to FIG. 9, the target touch component 200 is preferably a navigation key disposed at the bottom of the screen 101, referring to FIG. 18.

It should be noted that, not limited to the examples in FIG. 7 to FIG. 9, the system may further preset that other combinations of pressure levels and swipe characteristics correspond to the foregoing three system navigation functions. In actual application, system navigation functions triggered by three pressing operations shown in FIG. 7 to FIG. 9 may further interchange with each other. This is not limited.

In this embodiment of the present invention, in addition to the system navigation functions shown in FIG. 7 to FIG. 9, the pressure sensing operation provided in this embodiment of the present invention may be further used to trigger other functions. Details are described below.

Figure 10:
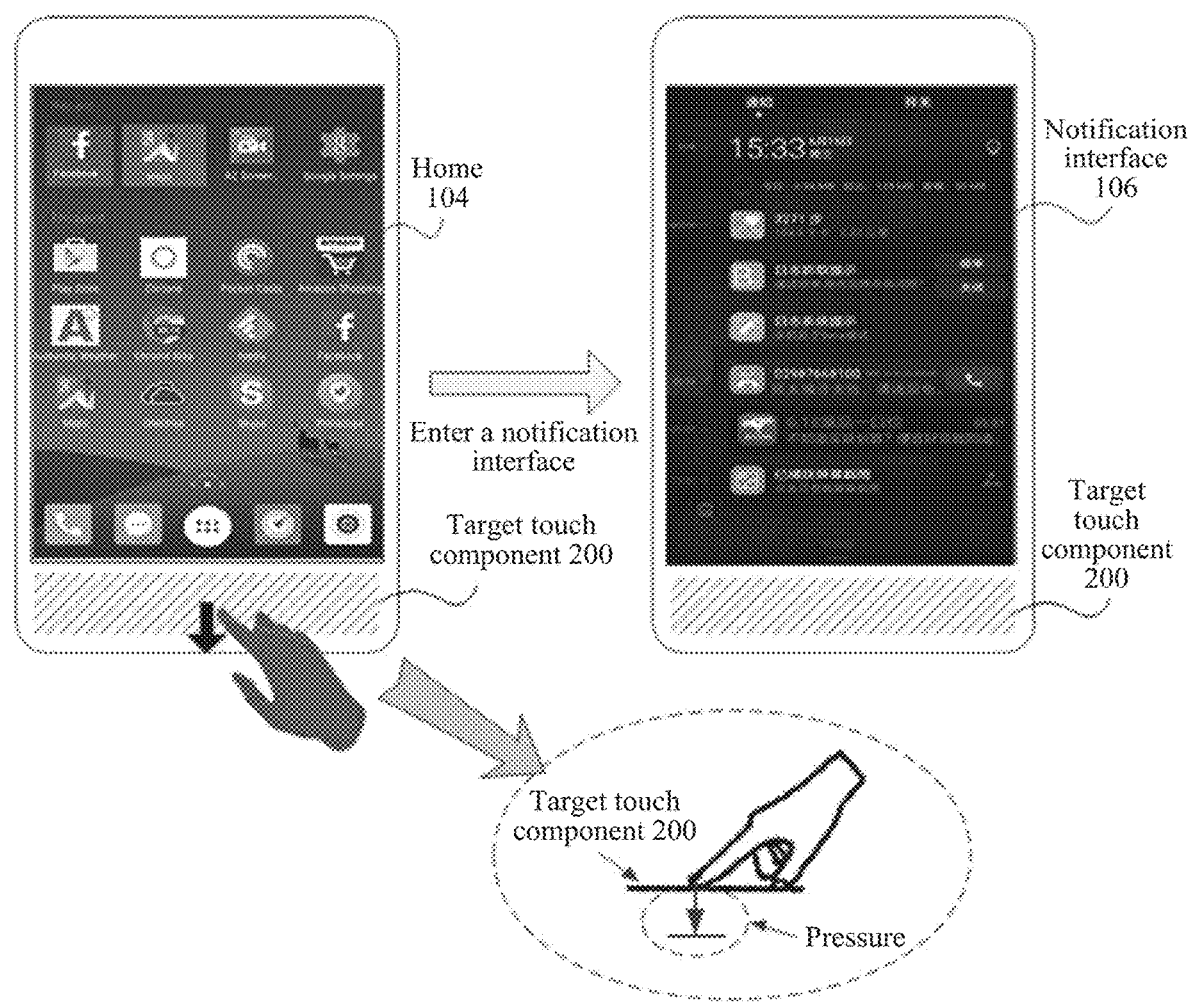
FIG. 10 is a schematic diagram of a function corresponding to a combination of a level-one pressure and swiping down according to an embodiment of the present invention.

As shown in FIG. 10, content currently being displayed on a screen 101 may be but is not limited to a home. In this case, a finger 300 lightly touches (corresponding to a level-one pressure) a target touch component 200 and swipes down on the target touch component 200. In specific implementation, a function corresponding to a pressure sensing operation (a combination of the level-one pressure and swiping down) shown in FIG. 10 may be preset to be enabling a notification interface. When detecting the pressure sensing operation shown in FIG. 10, a system may trigger to enable the system notification interface. That is, the system notification interface 106 is displayed on the screen 101, so as to provide convenience for a user to rapidly view a system notification.

Figure 11:
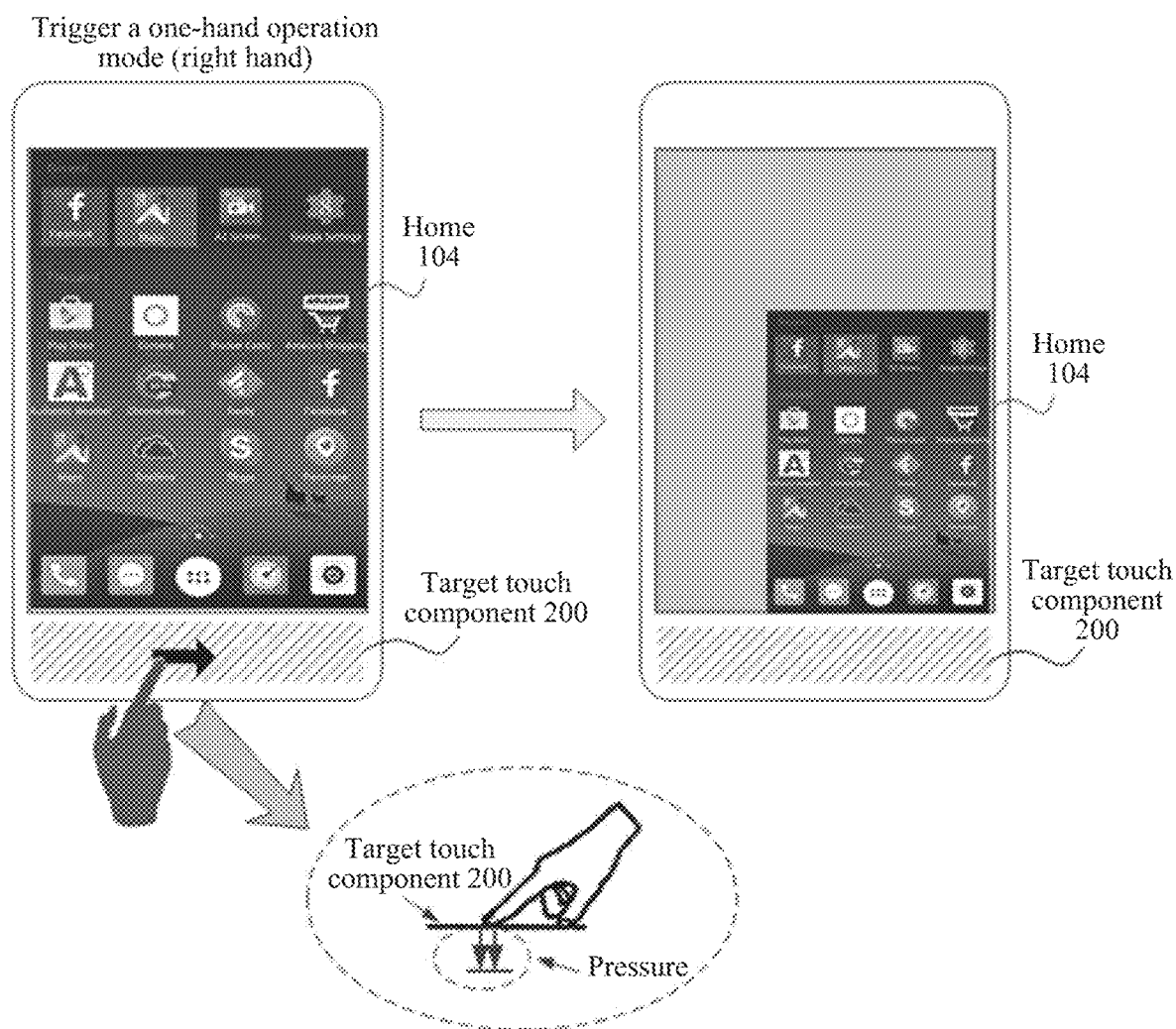
FIG. 11 is a schematic diagram of a function corresponding to a combination of a level-two pressure and swiping right according to an embodiment of the present invention.

As shown in FIG. 11, content currently being displayed on a screen 101 may be but is not limited to a home 104. In this case, a finger 300 forcefully presses (corresponding to a level-two pressure) a target touch component 200 and swipes right on the target touch component 200. In specific implementation, a function corresponding to a pressure sensing operation shown in FIG. 11 (a combination of the level-two pressure and swiping right) may be preset to be triggering to enter a one-right-hand operation mode. When detecting the pressure sensing operation shown in FIG. 11, a system may trigger to enter a one-right-hand operation mode, for example, diminish the content (such as the home 104) displayed on the screen 101, and move the displayed content to a location nearby a right-hand holding location, so as to provide convenience for a user to operate the displayed content with one right hand.

Figure 12:
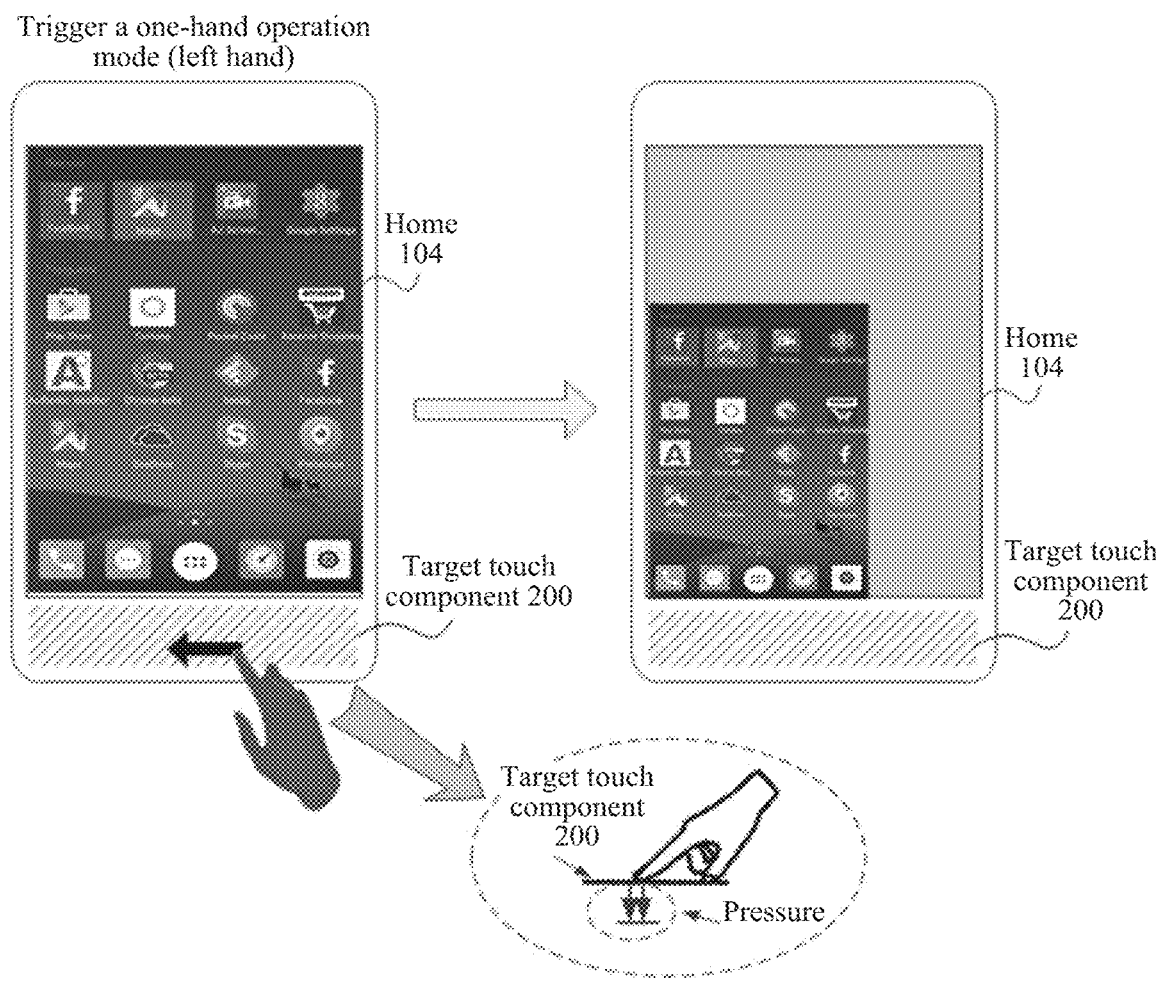
FIG. 12 is a schematic diagram of a function corresponding to a combination of a level-two pressure and swiping left according to an embodiment of the present invention.

Similarly, as shown in FIG. 12, a function corresponding to a pressure sensing operation shown in FIG. 12 (a combination of the level-two pressure and swiping left) may be preset to be triggering to enter a one-left-hand operation mode. When detecting the pressure sensing operation shown in FIG. 12, a system may trigger to enter a one-left-hand operation mode, for example, diminish the content (such as the home 104) displayed on the screen 101, and move the displayed content to a location nearby a left-hand holding location, so as to provide convenience for a user to operate the displayed content with one left hand.

It should be noted that, the swipe direction of the finger 300 may further include another direction, for example, swiping to upper left or swiping to lower right. This is not limited in this embodiment of the present invention. In specific implementation, pressure sensing operations at a same level of pressure may correspondingly trigger different functions with reference to different swipe directions. In actual application, pressure sensing operations at a same level of pressure may also correspondingly trigger a same function with reference to several different swipe directions. For example, swiping up or down of a pressure sensing operation at a level-one pressure on a target touch component 200 may be used to trigger to enable a system notification interface, and swiping left or right of a pressure sensing operation at the level-one pressure on the target touch component 200 may be used to trigger to perform a system navigation function "viewing a recent task list".

It should be noted that, FIG. 10 to FIG. 12 are only examples provided in the embodiments of the present invention, and should not constitute a limitation. The pressure sensing operations separately shown in FIG. 10 to FIG. 12 may be further used to trigger to perform other functions that are not limited to the functions separately shown in FIG. 10 to FIG. 12.

In some embodiments, pressure sensing operations at various levels of pressures may be further sub-divided into a plurality of different pressure sensing operations with reference to a swipe track of the finger 300, so as to correspondingly trigger different functions. Examples of descriptions are provided below with reference to FIG. 13 and FIG. 14.

Figure 13:
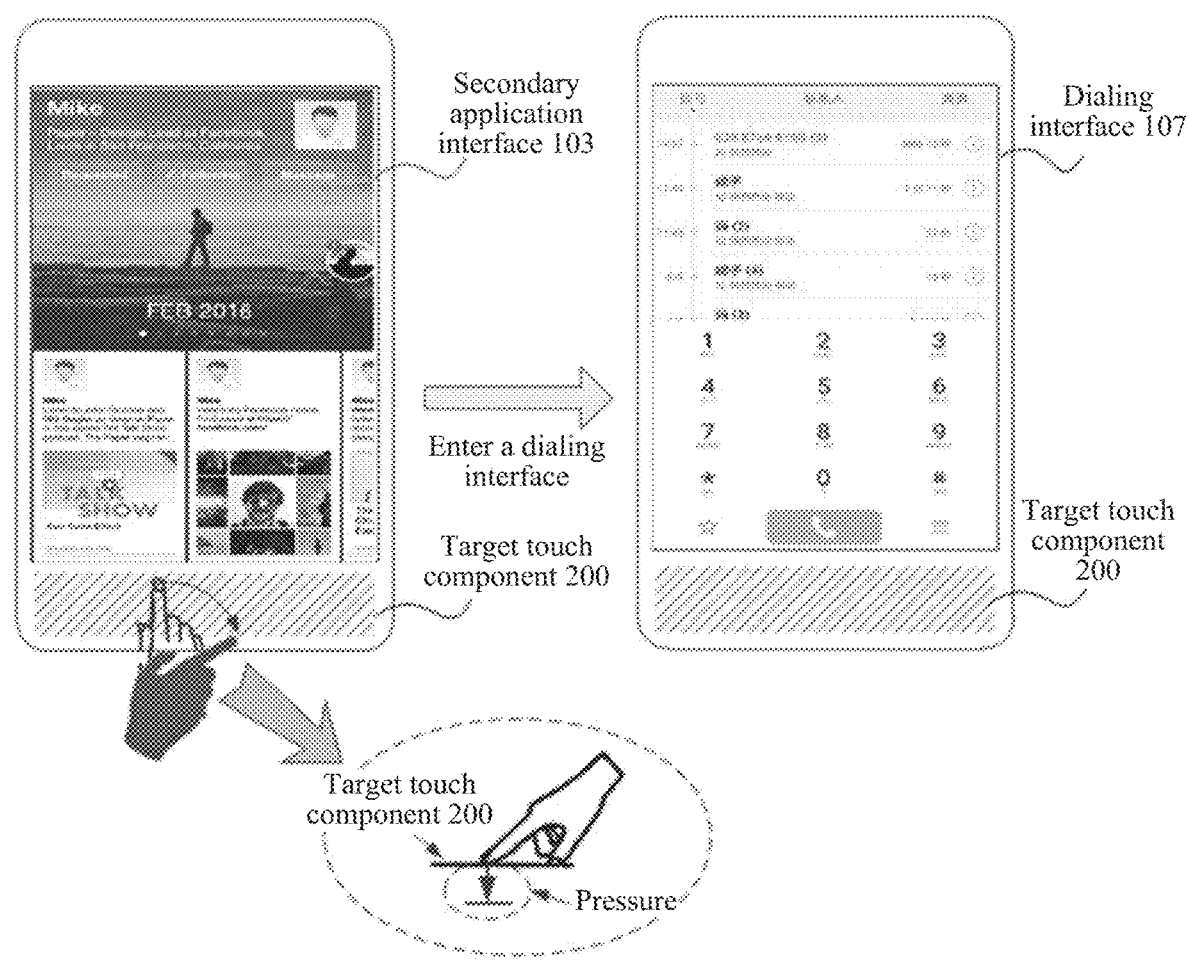
FIG. 13 is a schematic diagram of a function corresponding to a combination of a level-one pressure and a clockwise arc-shaped swipe track according to an embodiment of the present invention.

As shown in FIG. 13, content currently being displayed on a screen 101 may be but is not limited to a secondary application interface 103 of an application program Facebook. In this case, a finger 300 lightly touches (corresponding to a level-one pressure) a target touch component 200 and swipes on the target touch component 200, and a swipe track is a clockwise arc-shaped track. In specific implementation, a function triggered corresponding to a pressure sensing operation shown in FIG. 13 (a combination of the level-one pressure and the clockwise arc-shaped track) may be preset to be enabling a dialing interface. When detecting the pressure sensing operation shown in FIG. 13, a system may trigger to enable the dialing interface 107, so as to provide convenience for a user to dial at any time period.

Figure 14:
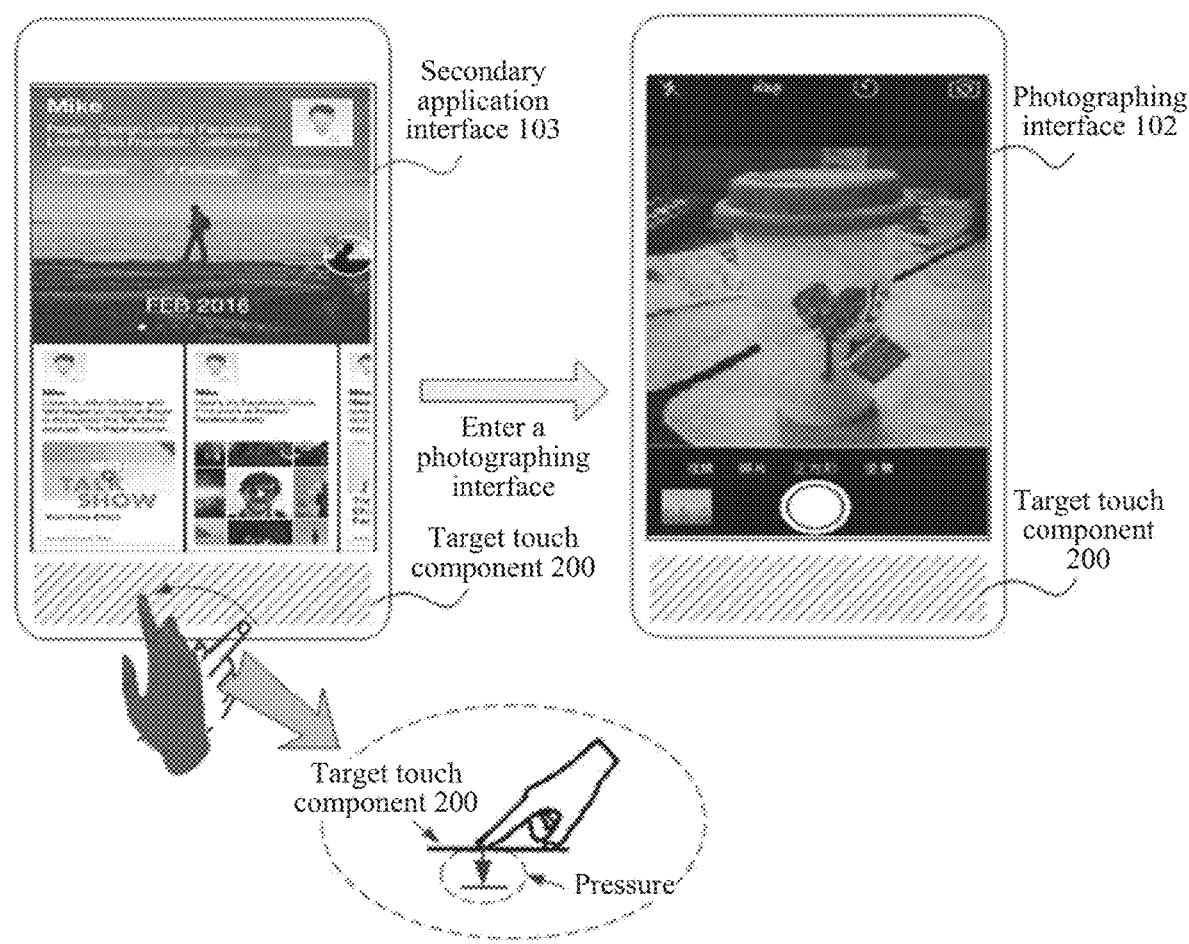
FIG. 14 is a schematic diagram of a function corresponding to a combination of a level-one pressure and a counter-clockwise arc-shaped swipe track according to an embodiment of the present invention.

As shown in FIG. 14, content currently being displayed on a screen 101 may be but is not limited to a secondary application interface 103 of an application program Facebook. In this case, a finger 300 lightly touches (corresponding to a level-one pressure) a target touch component 200 and swipes on the target touch component 200, and a swipe track is a counterclockwise arc-shaped track. In specific implementation, a function triggered corresponding to a pressure sensing operation shown in FIG. 14 (a combination of the level-one pressure and the counterclockwise arc-shaped track) may be preset to be enabling a photographing interface. When detecting the pressure sensing operation shown in FIG. 14, a system may trigger to enable the photographing interface 108, so as to provide convenience for a user to photograph at any time period.

It should be noted that, the swipe track of the finger 300 may further include another track such as a "Z" shaped swipe track. This is not limited in this embodiment of the present invention. FIG. 13 and FIG. 14 are only examples provided in the embodiments of the present invention, and should not constitute a limitation. The pressure sensing operations separately shown in FIG. 13 and FIG. 14 may be further used to trigger to perform other functions that are not limited to the functions separately shown in FIG. 13 and FIG. 14.

It should be noted that, for a scenario in which the finger 300 swipes when pressing the target touch component 200, pressure sensing operations at various levels of pressures may be further sub-divided into a plurality of different pressure sensing operations with reference to another swipe characteristic such as a swipe distance, so as to correspondingly trigger different functions.

In this embodiment of the present invention, the pressure sensing operations may be further sub-divided into a plurality of different pressure sensing operations with reference to action time periods corresponding to the pressure sensing operations, so as to correspondingly trigger different functions. Examples of descriptions are provided below with reference to FIG. 15 and FIG. 16.

Figure 15:
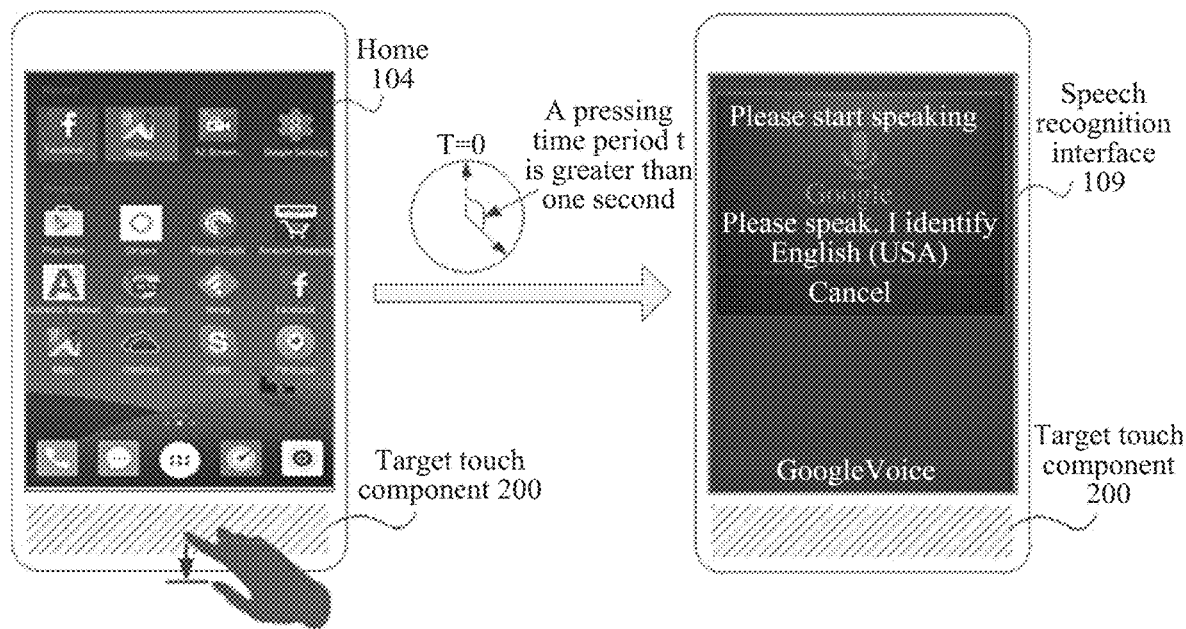
FIG. 15 is a schematic diagram of a function corresponding to a combination of a level-one pressure and touch&hold according to an embodiment of the present invention.

As shown in FIG. 15, content currently being displayed on a screen 101 may be but is not limited to a home 104. In this case, a finger 300 lightly touches (corresponding to a level-one pressure) a target touch component 200, the finger 300 does not swipe, and an action time period for which the light touch lasts exceeds a first time period threshold such as one second. In specific implementation, a function triggered corresponding to a pressure sensing operation shown in FIG. 15 (the level-one pressure, a combination of no swipe of the finger 300 and touch&hold) may be preset to be enabling a speech recognition interface. When detecting the pressure sensing operation shown in FIG. 15, a system may trigger to enable the speech recognition interface 109, so as to provide convenience for a user to perform speech control.

Figure 16:
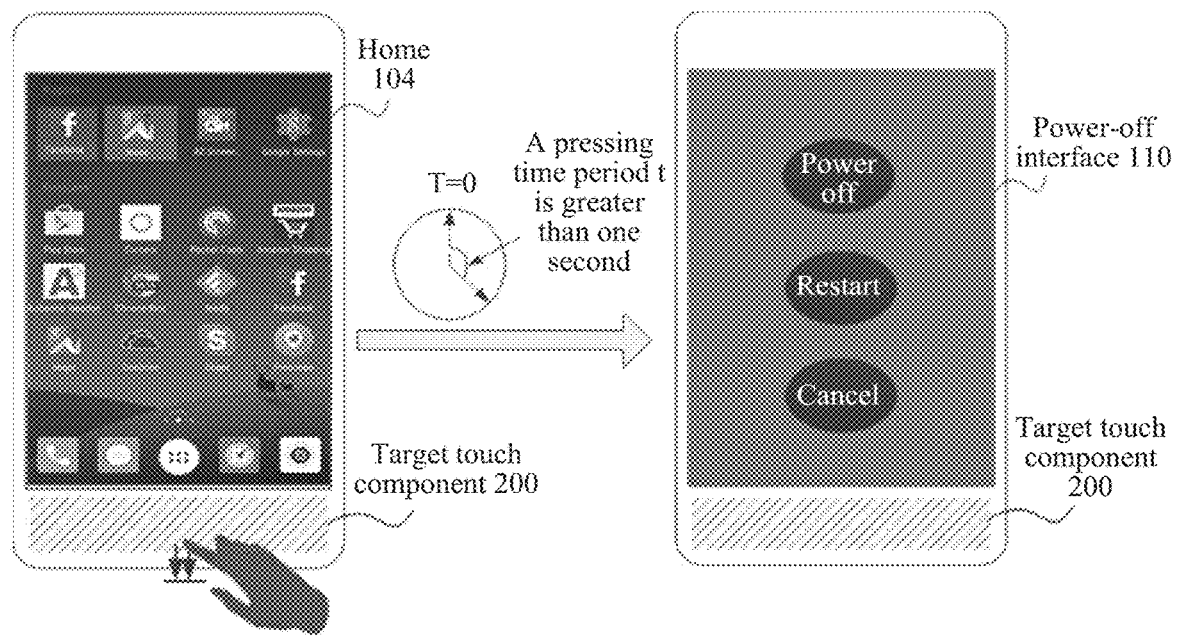
FIG. 16 is a schematic diagram of a function corresponding to a combination of a level-two pressure and touch&hold according to an embodiment of the present invention.

As shown in FIG. 16, content currently being displayed on a screen 101 may be but is not limited to a home 104. In this case, a finger 300 forcefully presses (corresponding to a level-two pressure) a target touch component 200, the finger 300 does not swipe, and an action time period for which the forceful pressing lasts exceeds a second time period threshold such as 1.5 seconds. In specific implementation, a function triggered corresponding to a pressure sensing operation shown in FIG. 16 (the level-two pressure, a combination of no swipe of the finger 300 and touch&hold) may be preset to be enabling a power-off interface. When detecting the pressure sensing operation shown in FIG. 16, a system may trigger to enable the power-off interface 110, so as to provide convenience for a user to perform a power-off operation.

It should be noted that, the first time period threshold and the second threshold may alternatively be set to a same time period value. That is, the system may uniform touch&hold and short tap corresponding to pressure sensing operations at various pressure levels. It should be noted that, a difference between action time periods corresponding to the pressure sensing operations may be further sub-divided, and is not limited to touch&hold and short tap.

It should be noted that, FIG. 15 and FIG. 16 are only examples provided in the embodiments of the present invention, and should not constitute a limitation. Not limited to the examples in FIG. 15 and FIG. 16, the system may further preset that other combinations of pressure levels, swipe characteristics, and action time periods correspond to the foregoing several functions. The pressure sensing operations separately shown in FIG. 15 and FIG. 16 may be further used to trigger to perform other functions that are not limited to the functions separately shown in FIG. 15 and FIG. 16.

Because of non-accuracy of user operations, at an initial moment at which the finger 300 comes into contact with the target touch component 200, a pressing pressure of the finger 300 acting on the target touch component 200 may be not consistent with a pressure that the user actually intends to trigger. The user usually needs an adaptation time period T0 to adjust the pressure of the finger 300 acting on the target touch component 200 to the pressure that the user actually intends to trigger. In this embodiment of the present invention, the adaptation time period T0 may be set based on experience and experimental data.

Figure 17:
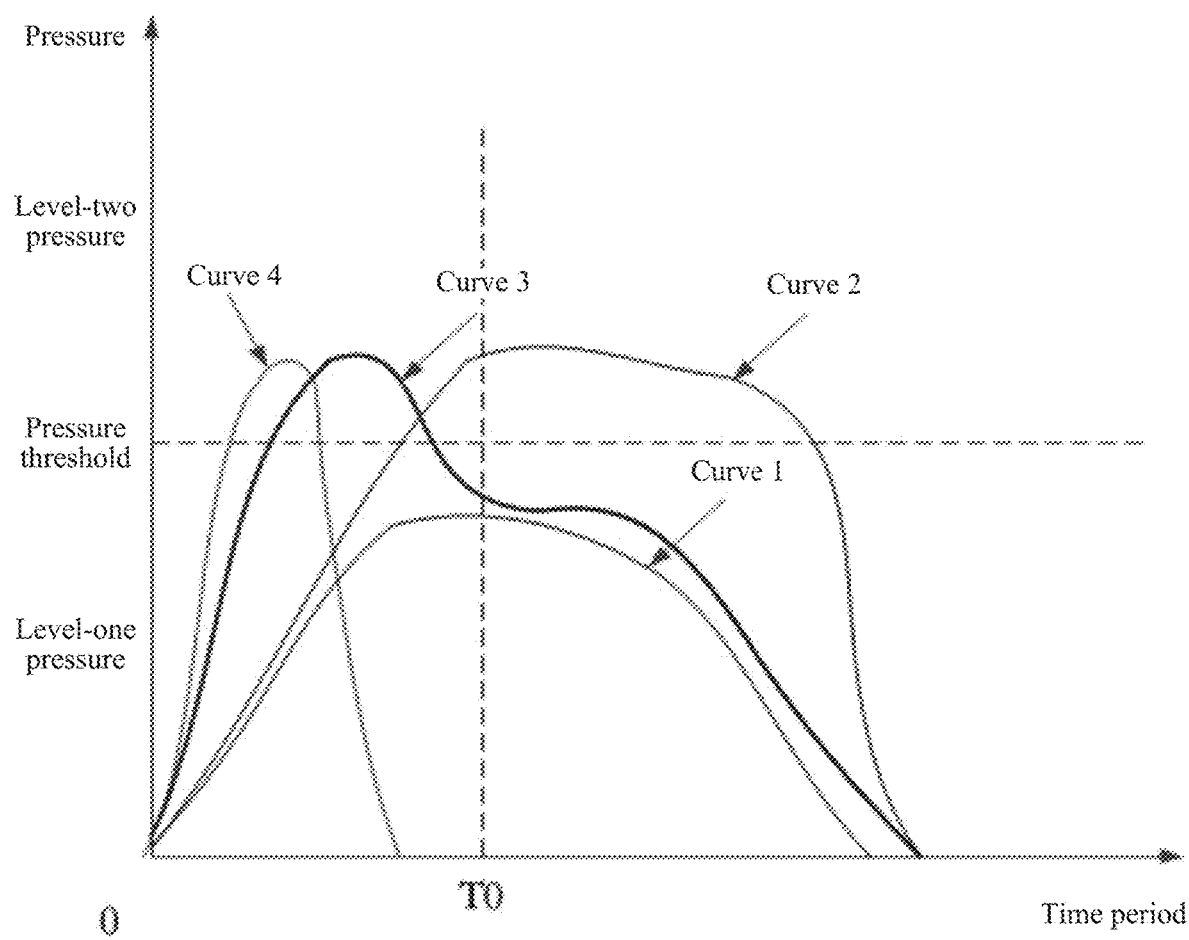
FIG. 17 is a pressure curve chart of several pressure sensing operations related to embodiments of the present invention.

As shown in FIG. 17, a curve 1 indicates a normal pressure sensing operation at a level-one pressure. A curve 2 indicates a normal pressure sensing operation at a level-two pressure. In many possible cases, a user cannot determine a pressure to be applied to a target touch component 200. Therefore, as shown by a curve 3, at an initial moment at which a finger 300 comes into contact with the target touch component 200, a pressing pressure of the finger 300 acting on the target touch component 200 is quickly increased to a relatively large value (greater than a pressure threshold shown in the figure), even if the user actually intends to trigger a relatively small level-one pressure. For example, when the user rapidly clicks the target touch component 200, a pressure of the finger 300 initially acting on the target touch component 200 is usually relatively large, even if the user actually intends to trigger a relatively small pressure. The user needs to take an adaptation time period T0 to adjust the pressure of the finger 300 acting on the target touch component 200 to be close to a pressure that is actually intended to be triggered.

In this embodiment of the present invention, to filter out some pressure sensing operations whose pressure values are not stable before the adaptation time period T0, when detecting a pressure sensing operation of the finger 300 acting on the target touch component 200, a system may obtain, after the adaptation time period T0, a pressure of the finger 300 acting on the target touch component 200, and determine, based on the pressure, a pressure level corresponding to the pressure sensing operation. It can be understood that, the curve 3 in FIG. 17 may be identified by the system as the pressure sensing operation at the level-one pressure. A curve 4 in FIG. 17 may be filtered out by the system, and is not identified as a valid pressure sensing operation.

Figure 18:
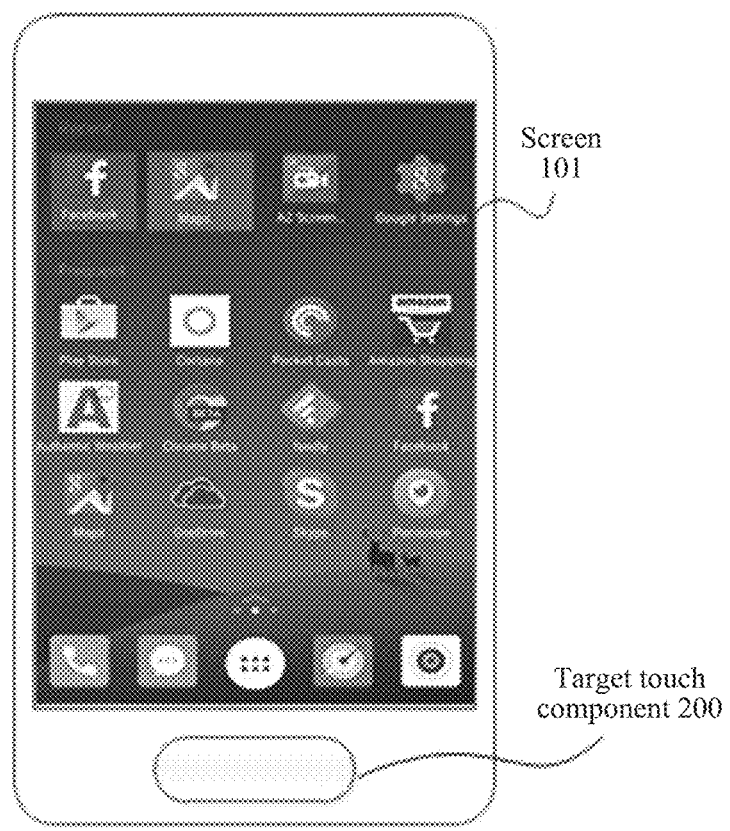
FIG. 18 is a schematic diagram of a disposition location of a target touch component according to an embodiment of the present invention.

In some embodiments, the target touch component 200 may be a navigation key disposed at the bottom of a screen 101, as shown in FIG. 18. In some embodiments, the target touch component 200 may be a pressure screen, and the pressure screen may be disposed in the screen 101 (to cover the screen 101 wholly or partially), or may be disposed in an area at the bottom of the screen, as shown in FIG. 2.

Figure 19:
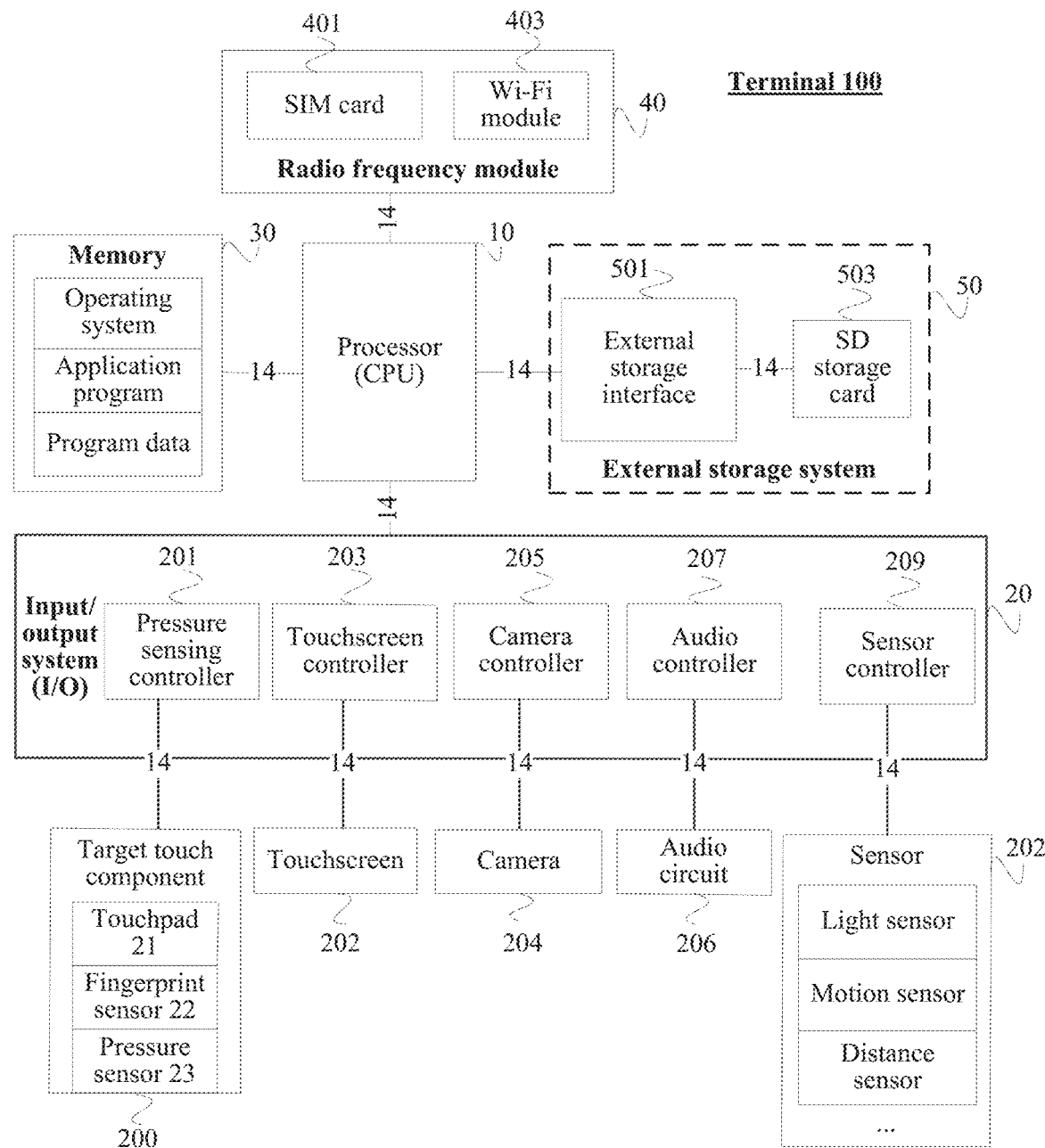
FIG. 19 is a schematic structural diagram of a terminal according to an embodiment of the present invention.

An implementation of a terminal related to an embodiment of the present invention is described below. FIG. 19 is a structural block diagram of an implementation of a terminal 100. The terminal 100 may include but is not limited to a mobile phone, a tablet computer, a wearable device or an M2M (Machine to Machine, English: machine to machine) terminal, or the like. As shown in FIG. 19, the terminal 100 may include: a processor 10, a memory 30 (one or more computer readable storage mediums), a radio frequency (RF) module 40, and an input/output system 20. In some embodiments, the terminal 100 may further include an external storage system 50. These components may communicate on one or more communications buses 14.

The input/output system 20 is mainly configured to implement a function of interaction between the terminal 100 and a user/external environment, and mainly includes an input/output apparatus of the terminal 100. In specific implementation, the input/output system 20 may include: a pressure sensing controller 201, a touchscreen controller 203, a camera controller 205, an audio controller 207, and a sensor management module 209. Controllers may be coupled to respective corresponding peripherals (such as a target touch component 200, a touchscreen 202, a camera 204, an audio circuit 206, and a sensor 208. It should be noted that, the input/output system 20 may further include another I/O peripheral.

The target touch component 200 mainly detects a pressing pressure and a swipe characteristic of a finger of the user on the target touch component 200, and may include a touchpad 21, a pressure sensor 23, and a fingerprint sensor 22. The pressure sensor 23 and the touchpad 21 are disposed opposite to each other, and the fingerprint sensor 22 and the touchpad 21 are disposed opposite to each other. The pressure sensor 23 is configured to detect a pressure sensing operation acting on the touchpad 21, and identify a pressure level corresponding to the pressure sensing operation. The fingerprint sensor 22 is configured to detect a swipe of the finger 300 acting on the touchpad 21, and can identify a swipe characteristic of the finger 300 on the touchpad 21, such as a swipe direction, a swipe track, or a swipe distance.

In specific implementation, the touchpad 21 may be a flexible insulation protection layer. The pressure sensor 23 may include a resistive strain gauge pressure sensor, a piezoresistive pressure sensor, an inductive pressure sensor, a capacitive pressure sensor, or the like. Using the resistive strain gauge pressure sensor as an example, a strain gauge in the resistive strain gauge pressure sensor is deformed because of a pressure. A pressure level that the pressure sensor 23 can identify corresponds to a deformation threshold of the strain gauge. For example, a level-one pressure corresponds to a first deformation threshold, and a level-two pressure corresponds to a second deformation threshold, where the second deformation threshold indicates a larger deformation extent. The example is used to only explain this embodiment of the present invention, and should not constitute a limitation.

In specific implementation, the fingerprint sensor 22 may include a capacitive fingerprint sensor, an inductive fingerprint sensor, an optical fingerprint sensor, or the like. Using the capacitive fingerprint sensor as an example, the fingerprint sensor 22 may be one capacitive electrode array, and one electrode corresponds to one coordinate point. When the finger 200 swipes, a swipe characteristic of the finger, such as a swipe direction or a swipe distance may be analyzed based on a capacitance change collected by each electrode.

In this embodiment of the present invention, the target touch component 200 may be disposed at the bottom of the touchscreen 202, referring to FIG. 2. In some embodiments, the target touch component 200 may be specifically a navigation key disposed at the bottom of the touchscreen 202, referring to FIG. 18. In the embodiment in FIG. 18, a pressure sensing operation acting on the target touch component 200 may be mainly used to trigger a system navigation function such as "backing", "jumping to home", or "viewing a recent task list". In some embodiments, the target touch component 200 may be a pressure screen, and the pressure screen may be disposed in a screen (to cover the screen wholly or partially), or may be disposed in an area at the bottom of a screen, as shown in FIG. 2.

It should be noted that, an area, a shape, and the like of the target touch component 200 may be set based on a specific requirement, and are not limited herein.

The processor 10 may integrate: one or more CPUs, a clock module, and a power management module. The clock module is mainly configured to generate, for the processor 10, a clock needed for data transmission and time period sequence control. The power management module is mainly configured to provide a stable and highly precise voltage to the processor 10, the radio frequency module 40, the input/output system 20, and the like.

The radio frequency (RF) module 40 is configured to receive and send a radio frequency signal, and mainly integrates a receiver and a transmitter of the terminal 100. The radio frequency (RF) module 40 communicates with a communications network and another communications device by using the radio frequency signal. In specific implementation, the radio frequency (RF) module 40 may include but is not limited to: an antenna system, an RF transceiver, one or more amplifiers, a tuner, one or more oscillators, a digital signal processor, a CODEC chip, a SIM card, a storage medium, and the like. In some embodiments, the radio frequency (RF) module 40 may be implemented on an independent chip.

The memory 30 is coupled to the processor 10, and is configured to store various software programs and/or a plurality of sets of instructions. In specific implementation, the memory 30 may include a high-speed random access memory, and may also include a non-volatile memory such as one or more magnetic disk storage devices, a flash memory device, or another non-volatile solid-state storage device. The memory 30 may store an operating system (briefly referred to as a system below), for example, an embedded operating system such as ANDROID, IOS, WINDOWS, or LINUX. The memory 30 may further store a network communications program, and the network communications program may be configured to communicate with one or more adjuncts, one or more terminal devices, and one or more network devices. The memory 30 may further store a user interface program, and the user interface program may visually and vividly display content of an application program by using a graphical operation interface, and receive a control operation of the user for the application program by using input controls such as a menu, a dialog box, and a key.

A cooperative relationship between the foregoing components in an embodiment of the present invention is described below in detail, referring to FIG. 20.

First step. A pressure sensor in a target touch component detects that a finger of a user comes into contact with and presses the target touch component, and identifies this user operation as a pressure sensing operation.

Second step. The pressure sensor identifies magnitude of a pressing pressure of the finger pressing the target touch component, and determines a pressure level corresponding to the pressure sensing operation based on the magnitude of the pressing pressure. Finally, the pressure level corresponding to the pressure sensing operation is sent to a processor.

Third step. When detecting that the finger of the user comes into contact with and presses the target touch component, the pressure sensor may further notify this contact event to a timer, to trigger the timer to start recording an action time period corresponding to the pressure sensing operation. In specific implementation, the timer in FIG. 20 may be provided by the processor 10, or may be carried in a pressure sensing touch device 21.

Fourth step. The processor may determine a function corresponding to the pressure level, and perform the function. It can be learned with reference to the foregoing content that, a system may preset a function corresponding to each pressure level. For example, as shown in FIG. 7, a function corresponding to a level-one pressure is a system navigation function "backing". For example, as shown in FIG. 8, a function corresponding to a level-two pressure is a system navigation function "jumping to home".

In specific implementation, after determining the function corresponding to the pressure level, the processor may further send a refresh instruction to a touchscreen, to refresh an interface. When sending the refresh instruction, the processor may further send UI data corresponding to a to-be-presented interface to the touchscreen, to trigger the touchscreen to display the to-be-presented interface.

For example, in the embodiment in FIG. 7, after determining that the function corresponding to the level-one pressure is the system navigation function "backing", the processor may determine that a previous level of application interface (that is, a to-be-presented interface) of the secondary application interface 103 is the primary application interface 102, then obtain the UI data corresponding to the primary application interface 102, and send the UI data to the touchscreen, to trigger the touchscreen to display the primary application interface 102.

Usually, the system stores an interface jumping sequence of application programs in a specified data structure such as a task stack (task stack) (also referred to as a back stack: back stack). In this way, a previous level of interface corresponding to a current interface may be obtained from the task stack of the system, thereby successfully backing to a previous interface state.

For another example, in the embodiment in FIG. 8, after determining that the function corresponding to the level-two pressure is the system navigation function "jumping to home", the processor may determine that a to-be-presented interface is the home 104, and then send UI data corresponding to the home 104 to the touchscreen, to trigger the touchscreen to display the home 104.

It should be noted that, the foregoing example is used to only describe this embodiment of the present invention, and should not constitute a limitation.

Fifth step. For the finger pressing the target touch component, a fingerprint sensor monitors whether the finger swipes on the target touch component; and if the finger swipes, collects a swipe direction of the finger, and informs the processor of the swipe direction. It should be noted that, the fingerprint sensor may further collect another fingerprint characteristic. To simplify the description, only the swipe direction is used as an example herein. In specific implementation, the fingerprint sensor may obtain fingerprint change data corresponding to the finger in a swipe process, and determine a swipe direction of the finger based on the fingerprint change data.

Sixth step. The processor may determine a function corresponding to a combination of the pressure level and the swipe direction, and perform the function.

It can be learned with reference to the foregoing content that, for different combinations formed by pressure levels and swipe directions, the system may preset respective functions corresponding to the combinations. For example, as shown in FIG. 9, a function corresponding to a combination of the level-one pressure and swiping right is the system navigation function "viewing a recent task list". For example, as shown in FIG. 10, a function corresponding to a combination of the level-two pressure and swiping down is enabling a system notification interface.

In specific implementation, after determining the function corresponding to the combination of the pressure level and the swipe direction, the processor may further send the refresh instruction to the touchscreen, to refresh an interface. When sending the refresh instruction, the processor may further send UI data corresponding to a to-be-presented interface to the touchscreen, to trigger the touchscreen to display the to-be-presented interface. For example, a to-be-presented interface in the embodiment in FIG. 9 is the recent task list 105. For example, a to-be-presented interface in the embodiment in FIG. 10 is the system notification interface 106.

Seventh step. In a process in which the finger presses the touch component, the timer may consecutively record the action time period corresponding to the pressure sensing operation, and may monitor whether the action time period exceeds a specified time period threshold; and if the action time period exceeds the specified time period threshold, notify the processor to perform corresponding processing.

In specific implementation, the system may set a time period threshold, and this time period threshold is the specified time period threshold. This time period threshold may be used to divide the action time period of the pressure sensing operation into touch&hold and short tap. For this implementation, when the timer detects that the action time period exceeds this time period threshold, the timer may notify the processor to perform a preset function corresponding to a combination of the pressure level and the touch&hold. For this implementation, if the action time period recorded by the timer has not reached this time period threshold when the finger leaves the target touch component, the timer may notify the processor to perform a preset function corresponding to a combination of the pressure level and the short tap.

Eighth step. The processor may determine a function corresponding to a combination of the action time period and the pressure level, and perform the function.

It can be learned with reference to the foregoing content that, for different combinations formed by the pressure levels and the action time periods, the system may preset respective functions corresponding to the combinations. For example, a function corresponding to a combination of the level-one pressure and the touch&hold is enabling a speech recognition interface. For example, a preset function corresponding to a combination of the level-one pressure and the short tap is the system navigation function "backing".

In specific implementation, after determining the function corresponding to the combination of the pressure level and the touch&hold, the processor may further send the refresh instruction to the touchscreen, to refresh an interface. When sending the refresh instruction, the processor may further send UI data corresponding to a to-be-presented interface to the touchscreen, to trigger the touchscreen to display the to-be-presented interface.

Ninth step. The pressure sensor detects that the finger leaves the target touch component, and may notify an event that the finger leaves the target touch component to the timer, to trigger the timer to end recording the action time period corresponding to the pressure sensing operation.

Finally, the pressure sensor may further notify the event that the finger leaves the target touch component to the processor, to trigger the processor to end running a corresponding program for the pressure sensing operation.

Figure 20:
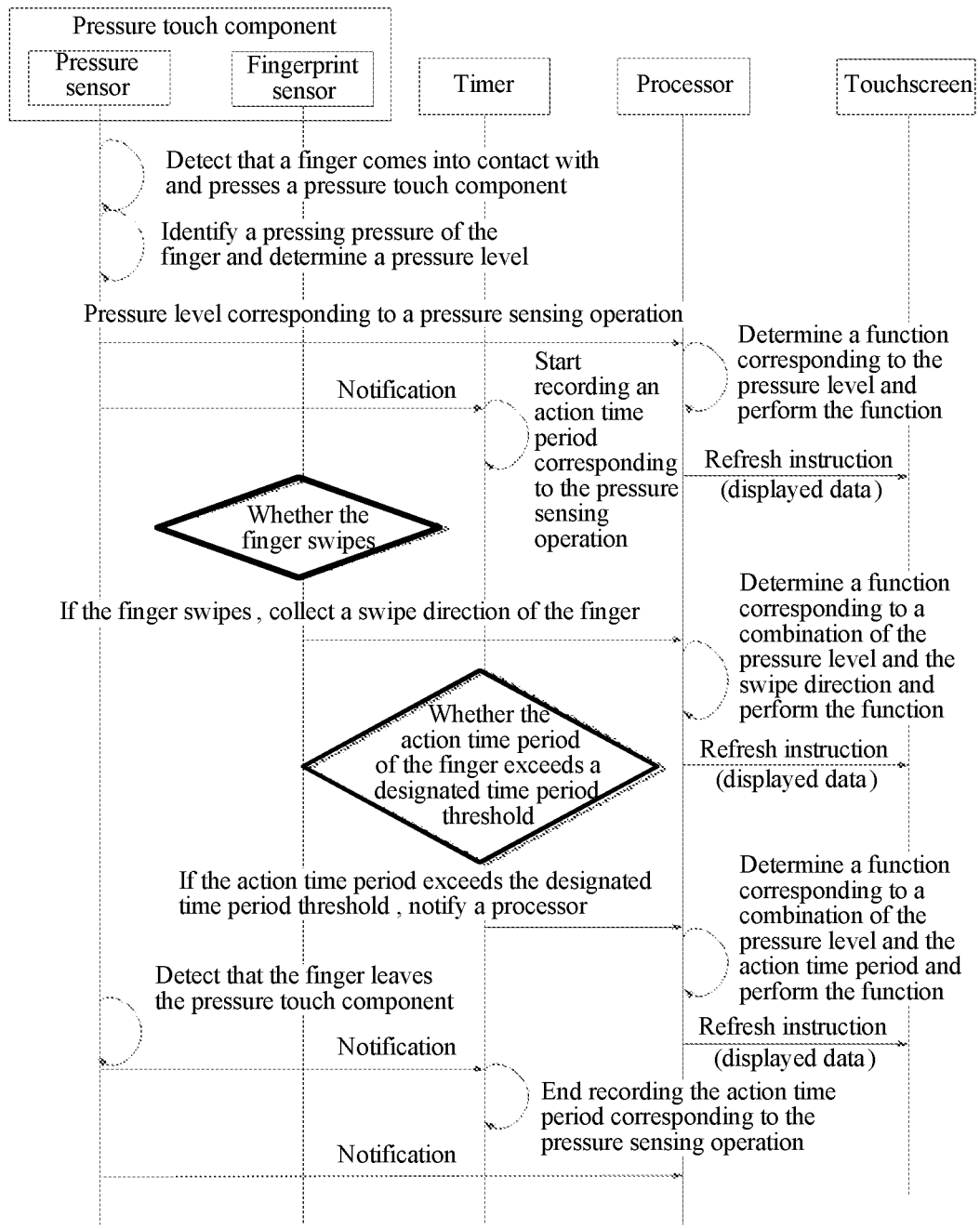
FIG. 20 is a schematic diagram of cooperative interaction between components of the terminal described in the embodiment in FIG. 19.

It should be noted that, FIG. 20 describes several different embodiments used to perform a function corresponding to the pressure sensing operation. The embodiments may specifically include the following implementations. First implementation: Determine, based on a pressure level corresponding to the pressure sensing operation, a function corresponding to the pressure sensing operation, and perform the function. Second implementation: Determine, based on a combination of a pressure level corresponding to the pressure sensing operation and a swipe characteristic corresponding to the pressure sensing operation, a function corresponding to the pressure sensing operation, and perform the function. Third implementation: Determine, based on a combination of a pressure level corresponding to the pressure sensing operation and an action time period corresponding to the pressure sensing operation, a function corresponding to the pressure sensing operation, and perform the function.

It should be noted that, the pressure sensor, the fingerprint sensor, and the timer in FIG. 20 may be configured to simultaneously detect three attributes of one pressure sensing operation: a pressure level, a swipe characteristic, and an action time period. Processes of detecting the three attributes described in FIG. 20 are concurrent, and are not in sequence. The processor may determine, based on a combination of the detected three attributes, a function corresponding to the pressure sensing operation. This is not limited to the embodiment in FIG. 20.

It should be understood that, the terminal 100 is only an example provided in this embodiment of the present invention. Moreover, the terminal 100 may have components more or less than the shown components, may combine two or more components, or may have different configuration implementations of components.

Based on the terminal 100 described in some embodiments shown in FIG. 2 to FIG. 18 and the embodiment in FIG. 20, a pressure touch method provided in an embodiment of the present invention is described below.

Figure 21:
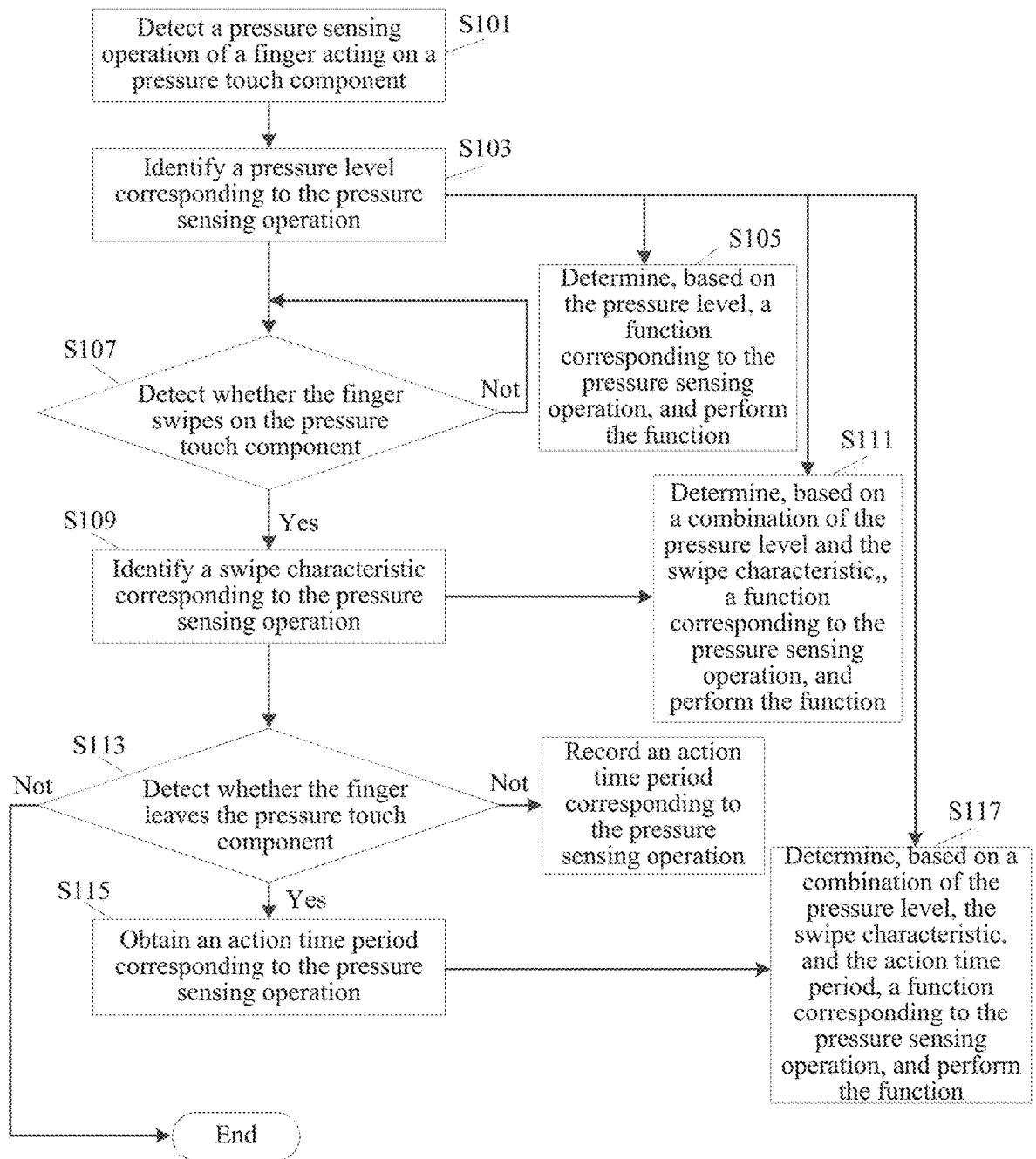
FIG. 21 is a schematic flowchart of a pressure touch method according to an embodiment of the present invention.

Referring to FIG. 21, FIG. 21 is a schematic flowchart of a pressure touch method according to an embodiment of the present invention. In the embodiment in FIG. 21, an execution body of S101 to S117 may be performed by the terminal 100 shown in FIG. 10 or at least one the processor in the terminal 100. A target touch component on the terminal may include a touchpad and a pressure sensor. The touchpad and the pressure sensor are disposed opposite to each other, and the pressure sensor may be configured to detect a pressure sensing operation acting on the touchpad, and identify a pressure level corresponding to the pressure sensing operation. For specific implementation of the target touch component, refer to the embodiment in FIG. 2. An example in which a terminal is an execution body is used below to make a description.

S101. The terminal detects, by using the pressure sensor, a pressure sensing operation of a finger generated on the target touch component. The pressure sensing operation related to this embodiment of the present invention is a user operation of pressing the target touch component by a user with a finger.

S103. The terminal identifies a pressure level corresponding to the pressure sensing operation.

In specific implementation, the terminal may set a pressure threshold, and the pressure threshold may be used to divide a pressure corresponding to the pressure sensing operation into two levels such as a level-one pressure and a level-two pressure shown in FIG. 3. The level-one pressure is a pressure less than the pressure threshold, and the level-two pressure is a pressure greater than the pressure threshold.

In actual application, the terminal may further set two pressure thresholds such as a first pressure threshold and a second pressure threshold, and the two pressure thresholds may be used to dividing a pressure corresponding to the pressure sensing operation into three levels. Specifically, a level-one pressure is a pressure less than the first pressure threshold, a level-two pressure is a pressure greater than the first pressure threshold and less than the second pressure threshold, and a level-three pressure is a pressure greater than the second pressure threshold. It should be noted that, the terminal may further set more pressure thresholds, and are used to sub-divide a pressure into more levels. This is not limited herein.

S105. The terminal determines a function corresponding to the pressure level, and performs the function. In this embodiment of the present invention, pressure sensing operations at different pressure levels may be used to trigger to perform different functions. The terminal may preset a function corresponding to each pressure level.

It can be understood that, different functions such as two system navigation functions shown in FIG. 7 and FIG. 8 are triggered to be performed by using pressure sensing operations at different pressure levels acting on the target touch component, the user can trigger the different functions when the finger does not leave the target touch component, and a touch location does not need to be changed, so as to enhance coherence of user operations.

In an application scenario, in addition to pressing the target touch component, the finger may further swipe on the target touch component.

For this application scenario, the terminal may determine, based on a combination of the pressure level and a swipe characteristic of the finger, a function corresponding to the pressure sensing operation. In this embodiment of the present invention, the swipe characteristic may include a swipe direction, a swipe distance, a swipe track, or the like.

In specific implementation, in addition to including the touchpad and the pressure sensor, the target touch component may further include a fingerprint sensor. The fingerprint sensor and the touchpad are disposed opposite to each other, and the fingerprint sensor may be configured to detect a swipe of the finger acting on the touchpad, and can identify a swipe characteristic of the finger. For specific implementation of the fingerprint sensor, refer to the embodiment in FIG. 4.

For this application scenario, as shown in FIG. 21, the pressure touch method may further include S107 to S111 that are specifically described as follows:

S107. The terminal detects, by using the fingerprint sensor, whether the finger swipes on the target touch component. Specifically, if the finger swipes on the target touch component, S109 may be triggered to be performed; or if the finger does not swipe on the target touch component, S107 may be repetitively performed, that is, whether the finger swipes continues to be monitored.

S109. The terminal identifies a swipe characteristic corresponding to the pressure sensing operation.

S111. The terminal determines, based on a combination of the pressure level and the swipe characteristic, a function corresponding to the pressure sensing operation, and performs the function. In specific implementation, the terminal may obtain, by using the fingerprint sensor, fingerprint change data corresponding to the finger in a swipe process, and then determine a swipe characteristic of the finger based on the fingerprint change data, such as a swipe direction.

In this embodiment of the present invention, the terminal may preset functions corresponding to one or more combinations of the pressure levels and the swipe characteristics. An example in which two levels of pressures (a level-one pressure and a level-two pressure) and a swipe direction are used to perform a description below. The level-one pressure is less than or equal to a specified pressure threshold, and the level-two pressure is greater than the specified pressure threshold.

For example, the terminal may preset that a function corresponding to a pressure sensing operation (a combination of the level-two pressure and swiping down) shown in FIG. 10 is enabling a system notification interface. When detecting the pressure sensing operation shown in FIG. 10, the terminal may enable the system notification interface. The examples are only some implementations in this embodiment of the present invention, may further differ in actual application, and should not constitute any limitation.

It should be noted that, for another combination that may be further formed by a pressure level and a swipe direction, refer to the foregoing content. Details are not described herein again. For a function corresponding to a combination of a pressure level and another swipe characteristic (such as a swipe distance or a swipe track), refer to the example provided in the foregoing content. Respective functions corresponding to combinations are not limited in this embodiment of the present invention.

Particularly, the target touch component may be a system navigation key. The pressure sensing operation acting on the system navigation key may be used to trigger system navigation functions. The system navigation functions may include backing, jumping to home, and viewing a recent task list.

In specific implementation, if the pressure level is the level-one pressure and a swipe distance of the finger is less than a preset distance threshold, the terminal may determine that the function corresponding to the pressure sensing operation is a first system navigation function. The first system navigation function may be one of the system navigation functions.

For example, referring to the pressure sensing operation shown in FIG. 7, the pressure level is the level-one pressure, and the finger does not swipe on the target touch component (satisfying a condition that a swipe distance of the finger is less than the preset distance threshold). The terminal may preset that a function corresponding to the pressure sensing operation shown in FIG. 7 is a system navigation function "backing".

In specific implementation, if the pressure level is the level-two pressure and a swipe distance of the finger is less than a preset distance threshold, the terminal may determine that the function corresponding to the pressure sensing operation is a second system navigation function. The second system navigation function may be one of the system navigation functions.

For example, referring to the pressure sensing operation shown in FIG. 8, the pressure level is the level-two pressure, and the finger does not swipe on the target touch component (satisfying a condition that a swipe distance of the finger is less than the preset distance threshold). The terminal may preset that a function corresponding to the pressure sensing operation shown in FIG. 8 is a system navigation function "jumping to home".

In specific implementation, if the pressure level is the level-one pressure (or the level-two pressure) and a swipe distance of the finger is greater than or equal to the preset distance threshold, it is determined that a function corresponding to the pressure sensing operation is a third system navigation function. The third system navigation function may be one of the system navigation functions. This implementation indicates that, if the finger pressing (a pressing pressure is the level-one pressure or the level-two pressure) the target touch component swipes, it is determined that the function corresponding to the pressure sensing operation is the third system navigation function.

If a condition that the swipe distance of the finger is greater than or equal to the preset distance threshold is satisfied, the terminal may further determine whether a swipe direction of the finger is a preset swipe direction such as swiping right; and if the swipe direction is a preset swipe direction, determine that a function corresponding to the swipe operation is the third system navigation function.

For example, referring to the pressure sensing operation shown in FIG. 9, the pressure level is the level-one pressure, and the finger swipes right on the target touch component (satisfying a condition that a swipe distance of the finger is greater than or equal to the preset distance threshold). The terminal may preset that a function corresponding to the pressure sensing operation shown in FIG. 9 is a system navigation function "viewing a recent task list".

In this embodiment of the present invention, the preset distance threshold is, for example, 0.1 centimeter, and is used to distinguish whether the finger obviously swipes. Specifically, if the finger obviously swipes, a swipe distance of the finger is greater than or equal to (including exceeding) the preset distance threshold; or if the finger has not obviously swiped, a swipe distance of the finger is less than the preset distance threshold.

It should be noted that, combinations of the pressure levels and the swipe characteristics corresponding to the first system navigation function, the second system navigation function, and the third system navigation function may further interchange with each other, and are not limited to the foregoing correspondence. That is, each of the first system navigation function, the second system navigation function, and the third system navigation function may be one of the three system navigation functions: backing to a previous level, jumping to home, and viewing a recent task list.

It should be noted that, not limited to the foregoing descriptions, the system may further preset that other combinations of pressure levels and swipe characteristics correspond to the foregoing three system navigation functions.

It can be understood that, the pressure sensing operation is divided with reference to the swipe characteristic based on the pressure level, and a corresponding function is triggered to be performed, so as to further enrich the function corresponding to the pressure sensing operation, and improve convenience and coherence of user operations.

In this embodiment of the present invention, an end moment of the pressure sensing operation is a moment at which the finger leaves the target touch component. In specific implementation, the terminal may detect whether the finger leaves the target touch component, as shown in S113.

If the finger leaves the target touch component, it is determined that the pressure sensing operation ends.

If the finger has not left the target touch component, that is, the finger still presses the target touch component, the terminal may record an action time period corresponding to the pressure sensing operation, determine, based on a combination of the pressure level, the swipe characteristic, and the action time period, a function corresponding to the pressure sensing operation, and perform the function, as shown in S115 to S117. In some embodiments, if the finger has not left the target touch component, the terminal may further repetitively perform S113. For example, the terminal may monitor, at a fixed time period interval (such as every 10 milliseconds), whether the finger leaves the target touch component.

In this embodiment of the present invention, for different combinations formed by pressure levels, swipe characteristics, and action time periods, the terminal may preset respective functions corresponding to the combinations. For a function corresponding to a combination of a pressure level, a swipe characteristic, and an action time period, refer to the example provided in the foregoing content. Respective functions corresponding to combinations are not limited in this embodiment of the present invention.

It can be understood that, the pressure sensing operation is divided with reference to the action time period based on the pressure level and the swipe characteristic, and a corresponding function is triggered to be performed, so as to further enrich the function corresponding to the pressure sensing operation, and improve convenience and coherence of user operations.

In this embodiment of the present invention, when detecting a pressure sensing operation of the finger acting on the target touch component, the terminal may obtain, after an adaptation time period T0, a pressure of the finger acting on the target touch component, and determine, based on the pressure, a pressure level corresponding to the pressure sensing operation. In this way, some pressure sensing operations whose pressure values are not stable before the adaptation time period T0 may be filtered out. For details, refer to FIG. 17 and the foregoing related content. Details are not described herein again.

In this embodiment of the present invention, the target touch component may be disposed at the bottom of a touchscreen of the terminal, referring to FIG. 2. In some embodiments, the target touch component may be specifically a navigation key disposed at the bottom of the touchscreen, referring to FIG. 18. In the embodiment in FIG. 18, a pressure sensing operation acting on the target touch component may be mainly used to trigger a system navigation function such as "backing", "jumping to home", or "viewing a recent task list". In some embodiments, the target touch component may be further disposed in the touchscreen, to partially or wholly cover the screen.

It should be noted that, for content not mentioned in the embodiment in FIG. 21, refer to the foregoing embodiments. Details are not described herein again.

Figure 22:
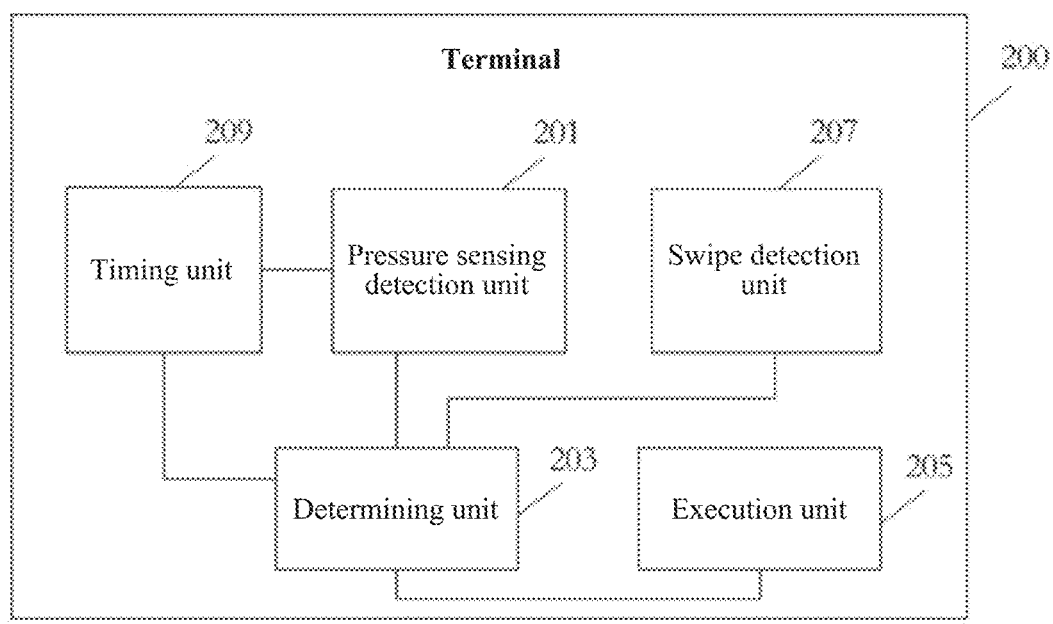
FIG. 22 is a schematic structural diagram of another terminal according to an embodiment of the present invention.

FIG. 22 is a schematic structural diagram of another terminal according to an embodiment of the present invention. As shown in FIG. 22, the terminal 200 may include: a pressure sensing detection unit 201, a determining unit 203, and an execution unit 205.

The pressure sensing detection unit 201 is configured to detect a pressure sensing operation of a finger acting on a target touch component.

The pressure sensing detection unit 201 is further configured to identify a pressure level corresponding to the pressure sensing operation.

The determining unit 203 is configured to determine, based on the pressure level, a function corresponding to the pressure sensing operation.

The execution unit 205 is configured to perform the function corresponding to the pressure level.

In specific implementation, the pressure sensing detection unit 201 may be disposed in the target touch component. The pressure sensing detection unit 201 may be configured to detect a pressure sensing operation acting on the target touch component, and identify a pressure level corresponding to the pressure sensing operation.

In specific implementation, the pressure sensing detection unit 201 may set a pressure threshold, and the pressure threshold may be used to divide a pressure corresponding to the pressure sensing operation into two levels such as a level-one pressure and a level-two pressure shown in FIG. 3. The level-one pressure is a pressure less than the pressure threshold, and the level-two pressure is a pressure greater than the pressure threshold.

In actual application, the pressure sensing detection unit 201 may further set two pressure thresholds such as a first pressure threshold and a second pressure threshold, and the two pressure thresholds may be used to dividing a pressure corresponding to the pressure sensing operation into three levels. Specifically, a level-one pressure is a pressure less than the first pressure threshold, a level-two pressure is a pressure greater than the first pressure threshold and less than the second pressure threshold, and a level-three pressure is a pressure greater than the second pressure threshold. It should be noted that, the pressure sensing detection unit 201 may further set more pressure thresholds, and are used to sub-divide a pressure into more levels. This is not limited herein.

In this embodiment of the present invention, pressure sensing operations at different pressure levels may be used to trigger to perform different functions. The terminal 200 may preset a function corresponding to each pressure level. For an example in which different pressure levels correspond to different functions, refer to the foregoing embodiments. Details are not described herein.

In some embodiments, as shown in FIG. 22, the terminal 200 may further include a swipe detection unit 207. The swipe detection unit 207 may also be disposed in the target touch component, and may be configured to detect a swipe of the finger on the target touch component and identify a swipe characteristic of the finger. Herein, the swipe characteristic may include a swipe direction, a swipe distance, a swipe track, or the like. In specific implementation, the swipe detection unit 207 may obtain fingerprint change data corresponding to the finger in a swipe process, and determine a swipe characteristic of the finger based on the fingerprint change data.

For a scenario in which the finger presses the target touch component and swipes, the determining unit 203 may be specifically configured to determine a function corresponding to a combination of the pressure level and the swipe characteristic.

In this embodiment of the present invention, for different combinations formed by pressure levels and swipe characteristics, the terminal 200 may preset respective functions corresponding to the combinations. For an example in which different combinations formed by pressure levels and swipe characteristics correspond to different functions, refer to the foregoing embodiments. Details are not described herein.

Particularly, the target touch component may be a system navigation key. The pressure sensing operation acting on the system navigation key may be used to trigger system navigation functions. The system navigation functions may include backing, jumping to home, and viewing a recent task list.

In specific implementation, if the pressure level is the level-one pressure and a swipe distance of the finger is less than a preset distance threshold, the determining unit 203 may determine that the function corresponding to the pressure sensing operation is a first system navigation function.

In specific implementation, if the pressure level is the level-two pressure and a swipe distance of the finger is less than a preset distance threshold, the determining unit 203 may determine that the function corresponding to the pressure sensing operation is a second system navigation function.

In specific implementation, if the pressure level is the level-one pressure (or the level-two pressure) and a swipe distance of the finger is greater than or equal to the preset distance threshold, the determining unit 203 may determine that a function corresponding to the pressure sensing operation is a third system navigation function.

In this embodiment of the present invention, each of the first system navigation function, the second system navigation function, and the third system navigation function is one of the three system navigation functions: backing to a previous level, jumping to home, and viewing a recent task list. For combinations of pressure levels and swipe characteristics corresponding to the system navigation functions, refer to the foregoing embodiments. Details are not described herein again.

If a condition that the swipe distance of the finger is greater than or equal to the preset distance threshold is satisfied, the determining unit 203 may further determine whether a swipe direction of the finger is a preset swipe direction such as swiping right; and if the swipe direction is a preset swipe direction, determine that a function corresponding to the swipe operation is the third system navigation function.

In this embodiment of the present invention, the preset distance threshold is, for example, 0.1 centimeter, and is used to distinguish whether the finger obviously swipes.

It should be noted that, not limited to the foregoing descriptions, the system may further preset that other combinations of pressure levels and swipe characteristics correspond to the foregoing three system navigation functions.

In some embodiments, as shown in FIG. 22, the terminal 200 may further include a timing unit 209. The timing unit 209 may be configured to record an action time period corresponding to the pressure sensing operation, that is, a time period for which the finger consecutively presses the target touch component. The determining unit 203 may be specifically configured to determine a function corresponding to a combination of the pressure level and the action time period.

In this embodiment of the present invention, for different combinations formed by pressure levels and action time periods, the terminal 200 may preset respective functions corresponding to the combinations. For an example in which different combinations formed by pressure levels and action time periods correspond to different functions, refer to the foregoing embodiments. Details are not described herein.

In this embodiment of the present invention, when detecting a pressure sensing operation of the finger acting on the target touch component, the pressure sensing detection unit 201 may further obtain, after an adaptation time period T0, a pressure of the finger acting on the target touch component, and determine, based on the pressure, a pressure level corresponding to the pressure sensing operation. In this way, some pressure sensing operations whose pressure values are not stable before the adaptation time period T0 may be filtered out. For details, refer to FIG. 17 and the foregoing related content. Details are not described herein again.

In this embodiment of the present invention, the target touch component may be disposed at the bottom of a touchscreen of the terminal 200, referring to FIG. 2. In some embodiments, the target touch component may be specifically a navigation key disposed at the bottom of the touchscreen, referring to FIG. 18. In the embodiment in FIG. 18, a pressure sensing operation acting on the target touch component may be mainly used to trigger a system navigation function such as "backing", "jumping to home", or "viewing a recent task list". In some embodiments, the target touch component may be further disposed in the touchscreen, to partially or wholly cover the screen.

It should be noted that, for specific implementation of functional units in the terminal 200 and content that is not mentioned in the embodiment in FIG. 22, refer to the foregoing embodiments. Details are not described herein again.

By implementing the embodiments of the present invention, different functions triggered to be performed by pressure sensing operations may be determined by using combinations of pressure levels and swipe directions, thereby improving convenience of one-hand operations of a user, and also enhancing coherence of user experience.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A pressure touch method, comprising:
   detecting a pressure sensing operation of a finger acting on a target touch component and a swipe of the finger on the target touch component, wherein the pressure sensing operation comprises a start time and an end time, and wherein the target touch component is a system navigation key;
   recording an action time period corresponding to the pressure sensing operation;
   filtering out the pressure sensing operation when the action time period is less than an adaptation time period, wherein the adaptation time period comprises a time between the start time of the pressure sensing operation and an adaptation time;
   obtaining a pressure level corresponding to the pressure sensing operation, wherein the pressure sensing operation comprises a first plurality of pressure values and a second plurality of pressure values, wherein the first plurality of pressure values is detected within the adaptation time period between the start time of the pressure sensing operation and the adaptation time, wherein the second plurality of pressure values is detected after the adaptation time period between the adaptation time and the end time of the pressure sensing operation, wherein at least one of the second plurality of pressure values that is detected after the adaptation time period is compared to a pressure threshold to determine whether the at least one of the second plurality of pressure values is less than the pressure threshold or greater than the pressure threshold, wherein the pressure level corresponding to the pressure sensing operation is determined to be a level-one pressure when the at least one of the second plurality of pressure values is less than the pressure threshold, and wherein the pressure level corresponding to the pressure sensing operation is determined to be a level-two pressure when the at least one of the second plurality of pressure values is greater than the pressure threshold;

determining, based on a combination of the pressure level corresponding to the pressure sensing operation, a swipe characteristic of the swipe, and the action time period, a function corresponding to the pressure sensing operation when the action time period is greater than the adaptation time period, wherein the function is one of three system navigation functions, wherein the three system navigation functions are backing to a previous level, jumping to home, and viewing a recent task list, and wherein determining the function comprises:
  determining that the function is a first system navigation function in response to the detecting that the pressure level is the level-one pressure and a swipe distance of the finger is less than a preset distance threshold;
  determining that the function is a second system navigation function in response to the detecting that the pressure level is the level-two pressure and the swipe distance of the finger is less than the preset distance threshold; and
  determining that the function corresponding to the pressure sensing operation is a third system navigation function in response to the detecting that the pressure level is the level-one pressure or the level-two pressure and the swipe distance of the finger is greater than or equal to the preset distance threshold, wherein the first system navigation function, the second system navigation function, and the third system navigation function are the three system navigation functions, wherein the level-one pressure is less than or equal to a specified pressure threshold, and wherein the level-two pressure is greater than the specified pressure threshold; and performing the function corresponding to the pressure sensing operation.

2. The pressure touch method of claim 1, wherein the swipe characteristic comprises a swipe direction.

3. The pressure touch method of claim 1, further comprising:
  obtaining fingerprint change data corresponding to the finger in a swipe process on the target touch component; and
  determining the swipe characteristic of the finger based on the fingerprint change data.

4. The pressure touch method of claim 1, wherein the swipe characteristic comprises a swipe track.

5. The pressure touch method of claim 1, wherein the swipe characteristic comprises a swipe curve.

6. The pressure touch method of claim 1, wherein the swipe characteristic comprises a swipe direction, the swipe distance, and a swipe curve.

7. The pressure touch method of claim 1, wherein the target touch component comprises a touchpad and a pressure sensor.

8. The pressure touch method of claim 7, wherein the pressure sensor comprises a resistive strain gauge pressure sensor, a piezoresistive pressure sensor, an inductive pressor sensor, or a capacitive sensor.

9. The pressure touch method of claim 1, further comprising starting a timer upon detecting the pressure sensing operation to record the action time period corresponding to the pressure sensing operation.

10. The pressure touch method of claim 1, wherein the first plurality of pressure values detected within the adaptation time period between the start time of the pressure sensing operation and the adaptation time comprises first pressure values less than the pressure threshold, wherein the second plurality of pressure values detected after the adaptation time period between the adaptation time and the end time of the pressure sensing operation comprises second pressure values greater than the pressure threshold, and wherein obtaining the pressure level corresponding to the pressure sensing operation comprises obtaining an indication that the pressure level is the level-two pressure.

11. A terminal, comprising:
  a target touch component comprising:
    a pressure sensor configured to detect a pressure sensing operation of a finger acting on the target touch component, wherein the pressure sensing operation comprises a start time and an end time, and wherein the target touch component is a system navigation key; and
    a fingerprint sensor coupled to the pressure sensor and configured to detect a swipe of the finger on the target touch component; and
  a processor coupled to the target touch component and configured to:
    record an action time period corresponding to the pressure sensing operation;
    filter out the pressure sensing operation when the action time period is less than an adaptation time period, wherein the adaptation time period comprises a time between the start time of the pressure sensing operation and an adaptation time;
    obtain a pressure level corresponding to the pressure sensing operation, wherein the pressure sensing operation comprises a first plurality of pressure values and a second plurality of pressure values, wherein the first plurality of pressure values is detected within the adaptation time period between the start time of the pressure sensing operation and the adaptation time, period, wherein the second plurality of pressure values is detected after the adaptation time period between the adaptation time and the end time of the pressure sensing operation, period, wherein at least one of the second plurality of pressure values that is detected after the adaptation time period is compared to a pressure threshold to determine whether the at least one of the second plurality of pressure values is less than the pressure threshold or greater than the pressure threshold, wherein the pressure level corresponding to the pressure sensing operation is determined to be a level-one pressure when the at least one of the second plurality of pressure values is less than the pressure threshold, and wherein the pressure level corresponding to the pressure sensing operation is determined to be a level-two pressure when the at least one of the second plurality of pressure values is greater than the pressure threshold;

determine, based on a combination of the pressure level corresponding to the pressure sensing operation, a swipe characteristic of the swipe, and the action time period, a function corresponding to the pressure sensing operation when the action time period is greater than the adaptation time period, wherein the function is one of three system navigation functions, wherein the three system navigation functions are backing to a previous level, jumping to home, and viewing a recent task list, and wherein determining the function comprises:

determining that the function is a first system navigation function in response to detecting that the pressure level is the level-one pressure and a swipe distance of the finger is less than a preset distance threshold;

determining that the function is a second system navigation function in response to detecting that the pressure level is the level-two pressure and the swipe distance of the finger is less than the preset distance threshold; and determining that the function corresponding to the pressure sensing operation is a third system navigation function in response to detecting that the pressure level is the level-one pressure or the level-two pressure and the swipe distance of the finger is greater than or equal to the preset distance threshold, wherein the first system navigation function, the second system navigation function, and the third system navigation function are the three system navigation functions, wherein the level-one pressure is less than or equal to a specified pressure threshold, and wherein the level-two pressure is greater than the specified pressure threshold; and perform the function corresponding to the pressure sensing operation.

12. The terminal of claim 11, wherein the swipe characteristic comprises a swipe direction.

13. The terminal of claim 11, wherein the fingerprint sensor is further configured to obtain fingerprint change data corresponding to the finger in a swipe process on the target touch component, and wherein the processor is further configured to determine the swipe characteristic of the finger based on the fingerprint change data obtained by the fingerprint sensor.

14. The terminal of claim 11, wherein the swipe characteristic comprises a swipe track.

15. The terminal of claim 11, wherein the swipe characteristic comprises a swipe curve.

16. The terminal of claim 11, wherein the swipe characteristic comprises a swipe direction, the swipe distance, and a swipe curve.

17. The terminal of claim 11, wherein the pressure sensor comprises a resistive strain gauge pressure sensor, a piezoresistive pressure sensor, an inductive pressor sensor, or a capacitive sensor.

18. The terminal of claim 11, further comprising a timer coupled to the processor, wherein the processor is further configured to start the timer upon detecting the pressure sensing operation to record the action time period corresponding to the pressure sensing operation.

19. A computer program product comprising computer-executable instructions stored on a non-transitory computer-readable medium that, when executed by a processor, cause an apparatus to:

detect a pressure sensing operation of a finger acting on a target touch component and a swipe of the finger on the target touch component, wherein the pressure sensing operation comprises a start time and an end time, and wherein the target touch component is a system navigation key;

record an action time period corresponding to the pressure sensing operation;

filter out the pressure sensing operation when the action time period is less than an adaptation time period, wherein the adaptation time period comprises a time between the start time of the pressure sensing operation and an adaptation time;

obtain a pressure level corresponding to the pressure sensing operation, wherein the pressure sensing operation comprises a first plurality of pressure values and a second plurality of pressure values, wherein the first plurality of pressure values is detected within the adaptation time period between the start time of the pressure sensing operation and the adaptation time, wherein the second plurality of pressure values is detected after the adaptation time period between the adaptation time and the end time of the pressure sensing operation, wherein at least one of the second plurality of pressure values that is detected after the adaptation time period is compared to a pressure threshold to determine whether the at least one of the second plurality of pressure values is less than the pressure threshold or greater than the pressure threshold, wherein the pressure level corresponding to the pressure sensing operation is determined to be a level-one pressure when the at least one of the second plurality of pressure values is less than the pressure threshold, and wherein the pressure level corresponding to the pressure sensing operation is determined to be a level-two pressure when the at least one of the second plurality of pressure values is greater than the pressure threshold;

determine, based on a combination of the pressure level corresponding to the pressure sensing operation, a swipe characteristic of the swipe, and the action time period, a function corresponding to the pressure sensing operation when the action time period is greater than the adaptation time period, wherein the function is one of three system navigation functions, wherein the three system navigation functions are backing to a previous level, jumping to home, and viewing a recent task list, and wherein determining the function comprises:

determining that the function is a first system navigation function in response to detecting that the pressure level is the level-one pressure and a swipe distance of the finger is less than a preset distance threshold;

determining that the function is a second system navigation function in response to detecting that the pressure level is the level-two pressure and the swipe distance of the finger is less than the preset distance threshold; and determining that the function corresponding to the pressure sensing operation is a third system navigation function in response to detecting that the pressure level is the level-one pressure or the level-two pressure and the swipe distance of the finger is greater than or equal to the preset distance threshold, wherein the first system navigation function, the second system navigation function, and the third system navigation function are the three system navigation functions, wherein the level-one pressure is less than or equal to a specified pressure threshold, and wherein the level-two pressure is greater than the specified pressure threshold; and perform the function corresponding to the pressure sensing operation.

20. The computer program product of claim 19, wherein the swipe characteristic comprises a swipe direction, the swipe distance, and a swipe curve.

\* \* \* \* \*

UNITED STATES PATENT AND TRADEMARK OFFICE
CERTIFICATE OF CORRECTION

PATENT NO. : 11,175,821 B2
APPLICATION NO. : 16/336288
DATED : November 16, 2021
INVENTOR(S) : Jie Xu and Gang Wu Page 1 of 1

It is certified that error appears in the above-identified patent and that said Letters Patent is hereby corrected as shown below:

In the Claims

Claim 11, Column 30, Line 58: "period, wherein the second" should read "wherein the second"

Claim 11, Column 30, Line 61: "operation, period, wherein" should read "operation, wherein"

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*